US006378296B1

(12) United States Patent
Yasui et al.

(10) Patent No.: US 6,378,296 B1
(45) Date of Patent: Apr. 30, 2002

(54) DEGRADATION DISCRIMINATION SYSTEM OF INTERNAL COMBUSTION ENGINE EXHAUST GAS PURIFICATION SYSTEM

(75) Inventors: Yuji Yasui; Yoshihisa Iwaki; Masahiro Satoh, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/551,209

(22) Filed: Apr. 17, 2000

(30) Foreign Application Priority Data

Apr. 16, 1999 (JP) .......................................... 11-109452

(51) Int. Cl.[7] ................................................. F01N 3/00
(52) U.S. Cl. ........................... 60/277; 60/274; 60/278; 60/295; 60/297
(58) Field of Search .......................... 60/274, 277, 297, 60/285, 278, 295

(56) References Cited

U.S. PATENT DOCUMENTS

| 5,357,749 A | * 10/1994 | Ohsuga et al. ................. 60/274 |
| 5,524,433 A | * 6/1996 | Adamczyk, Jr. et al. ....... 60/277 |
| 5,584,177 A | * 12/1996 | Oketani et al. ................ 60/277 |
| 5,634,332 A | * 6/1997 | Tanaka et al. ................. 60/277 |
| 5,647,206 A | * 7/1997 | Yamamoto et al. ............ 60/297 |
| 5,765,369 A | * 6/1998 | Tanaka et al. ................. 60/277 |
| 5,798,270 A | * 8/1998 | Adamczyk, Jr. et al. ....... 60/277 |
| 5,865,027 A | * 2/1999 | Hanafusa et al. .............. 60/277 |
| 5,946,906 A | * 9/1999 | Akazaki et al. ................ 60/297 |
| 5,979,157 A | * 11/1999 | Kinugasa et al. .............. 60/285 |
| 6,092,368 A | * 7/2000 | Ishii et al. ..................... 60/277 |
| 6,151,547 A | * 11/2000 | Kumar et al. .................. 60/274 |

FOREIGN PATENT DOCUMENTS

| JP | 8-93458 | 4/1996 |
| JP | 8-218850 | 8/1996 |
| JP | 10-300718 | 11/1998 |

* cited by examiner

Primary Examiner—Thomas Denion
Assistant Examiner—Diem Tran
(74) Attorney, Agent, or Firm—Arent Fox Kintner Plotkin & Kahn, PLLC

(57) ABSTRACT

A system for discriminating degradation of an exhaust purification system of an internal combustion engine having an adsorbent installed at a bypass exhaust gas passage branched from an exhaust pipe of the engine, which is opened by a switch-over valve at starting of the engine to introduce the exhaust gas such that the adsorbent adsorbs unburned HC in exhaust gas generated by the engine and is closed such that the adsorbent desorbs the adsorbed HC and the desorbed HC is thereafter recirculated at a position upstream of a catalyst. In the system, an inflow amount and outflow amount of HC flowing in and out of the adsorbent are determined based at least on the engine operating conditions and the detected concentration of HC. Then, the ratio therebetween is calculated and compared with a threshold value and if the ratio is less than the threshold value, the adsorbent is discriminated to be degraded, thereby enabling to improve the discrimination accurately.

34 Claims, 38 Drawing Sheets

FIG.5

| ZEOLITES | PORE SIZE | C2H6 ETHANE | C3H8 PROPANE | C5H12 PENTANE | C7H8 TOLUENE | C8H18 ISOOCTANE |
|---|---|---|---|---|---|---|
| ZSM-5 [Ga-MFI / Ag/P-ZSM-5] | | × | △ | ○ | △ | × |
| MORDENITE | | × | × | △ | ○ | ○ |
| Y-TYPE | | × | × | × | △ | ○ |

HC ADSORBING

ADSORBENT TEMPERATURE RISING

HC DESORBING AND PURGING

DEGRADATION DISCRIMINATION SYSTEM OF INTERNAL COMBUSTION ENGINE EXHAUST GAS PURIFICATION SYSTEM

BACKGROUND OF THE INVENTION

1. Field of the Invention

This invention relates to a degradation discrimination system of an internal combustion engine exhaust gas purification system, more particularly to a system for discriminating whether an exhaust gas purification system comprising an adsorbent for adsorbing unburned components including the hydrocarbons (HC) in the exhaust gas generated by an internal combustion engine, has degraded or deteriorated.

2. Description of the Related Art

Internal combustion engines are ordinarily provided with a catalyst (a three-way catalytic converter) in the exhaust system which removes HC, NOx and CO components in the exhaust gas generated by the engine. However, when the catalyst is not activated, for example, at the time of engine cold-starting, unburned components of the exhaust gas including unburned HC are released immediately into the atmosphere.

For that reason, there has been proposed an exhaust gas purification system which has an adsorbent made of a zeolite material or some similar material installed in a bypass exhaust gas passage branched from the exhaust pipe at a location downstream of the catalyst, which merges into the exhaust pipe at a downstream point and has a switch-over valve which opens or closes the bypass exhaust gas passage. The switch-over valve opens the bypass exhaust gas passage when the engine is started to introduce the exhaust gas such that the adsorbent adsorbs unburned components including the HC when the catalyst is not activated and closes the bypass exhaust gas passage such that the adsorbent desorbs the adsorbed component and the desorbed components are thereafter recirculated at a position upstream of the catalyst after the catalyst has been activated.

Since a desired exhaust gas purification can not be achieved if any degradation or abnormality arises in such an engine exhaust gas purification system, Japanese Laid-Open Patent Application No. Hei 8 (1996)-93,458, for example, proposes the technique to discriminate whether any degradation or abnormality arises in the system. Another Japanese Laid-Open Patent Application, No. Hei 8 (1996)-218, 850 proposes a similar technique.

Specifically, Japanese Laid-Open Patent Application No. Hei 8 (1996)-93, 458 proposes providing an HC sensor at a position downstream of the bypass exhaust gas passage for detecting the HC concentration of the exhaust gas at that location. In this prior art, the HC sensor detects the HC concentration in the adsorption mode and in the desorption mode respectively. The detected values are compared with predetermined values and based on the result of the comparison, it is discriminated whether any trouble has occurred in a mechanical part such as a switch-over valve.

In addition, this prior art proposes providing the HC sensor at a recirculation passage to determine the total amount of HC being recirculated, and by comparing the determined amount with a predetermined value, it discriminates whether any trouble has occurred in a mechanical part such as a valve for opening/closing the recirculation passage.

Japanese Laid-Open Patent Application No. Hei 8 (1996)-218,850 proposes providing $O_2$ sensors at a position upstream of the adsorbent, but downstream of the catalyst and at a position upstream of the recirculation passage. In this prior art, a time lapse until the rich/lean signals of both the sensors become equal to each other is measured and based on the measured time, it discriminates whether any abnormality arises in the system such as at the adsorbent.

Specifically, based on the assumption that the air/fuel ratio in the recirculation passage becomes richer than that at a position downstream of the adsorbent since the desorbed HC is recirculated together with the exhaust gas, but becomes equal to the air/fuel downstream of the adsorbent after the desorbed HC has been purified, the second prior art conducts the discrimination by measuring the time lapse until the outputs of the air/fuel ratio sensors coincide. Similarly, the second prior art proposes providing an HC sensor, instead of the oxygen sensor, to discriminate the occupance of abnormality based on the HC concentration in the desorption mode.

Although the first prior art mentioned in Japanese Laid-Open Patent Application No. Hei 8 (1996)-93, 458 monitors the behavior of HC directly through the HC sensor, the first prior art can only discriminate the abnormality occurring in a mechanical part such as the switch-over valve. In other words, the first prior art can not discriminate the abnormality or degradation arising in the adsorbent.

The second prior art mentioned in Japanese Laid-Open Patent Application No. Hei 8 (1996)-218, 850 can discriminate the abnormality or degradation arising in the system including the adsorbent by detecting the HC concentration in the desorption mode. However, since the second prior art does not detect the concentration or amount of HC flowing and adhering to the adsorbent in the adsorption mode, the second prior art is not always satisfactory in the discrimination accuracy if there are variances in the amount of HC. The same argument will also be applied in a case when the amount of recirculation fluctuates.

SUMMARY OF THE INVENTION

An object of the invention is therefore to provide a degradation discrimination system of an internal combustion engine exhaust gas purification system having an adsorbent installed at a bypass exhaust gas passage branched from the exhaust pipe that is opened by a switch-over valve at engine starting to introduce the exhaust gas such that the adsorbent adsorbs unburned HC components in the exhaust gas generated by the engine and is closed such that the adsorbent desorbs the HC component and the desorbed HC component is thereafter recirculated at a location upstream of a catalyst, which enables to discriminate the degradation or deterioration of the adsorbent accurately by directly monitoring the behavior of the HC component including the absorption mode during which the adsorbent adsorbs the HC component through an HC concentration detecting means.

In order to achieve the object, there is provided a system for discriminating degradation of an exhaust purification system of an internal combustion engine having an adsorbent installed at a bypass exhaust gas passage branched from an exhaust pipe of the engine and merged into the exhaust pipe at a location downstream of the adsorbent, the bypass exhaust gas passage being opened by a switch-over valve at starting of the engine to introduce the exhaust gas such that the adsorbent adsorbs unburned HC in exhaust gas generated by the engine and being closed such that the adsorbent desorbs the adsorbed HC and the desorbed HC is thereafter recirculated at a position upstream of a catalyst, comprising: engine operating condition detecting means for detecting operating conditions of the engine; an HC sensor installed at the bypass exhaust gas passage for detecting concentration of HC introduced in the bypass exhaust gas passage; inflow HC amount determining means for determining an inflow amount of HC flowing in the bypass exhaust gas passage and to the adsorbent based at least on an engine speed and an engine load of the detected engine operating conditions and the detected concentration of HC; outflow HC amount determining means for determining an outflow amount of HC flowing out of the adsorbent and the bypass exhaust gas passage based at least on the engine speed and the engine load of the detected engine operating conditions and the detected concentration of HC; and adsorbent degradation discriminating means for discriminating whether the adsorbent has degraded based on the determined inflow HC amount and the outflow HC amount.

BRIEF EXPLANATION OF THE DRAWINGS

The objects and advantages of the invention will become more apparent from the following descriptions and drawings, in which:

FIG. 5 is a chart showing the property of zeolites (to be used as a material for an adsorbent illustrated in FIG. 1) relative to HC compounds in the exhaust gas generated by the engine;

PREFERRED EMBODIMENTS OF THE INVENTION

Embodiments of the invention will now be explained with reference to the drawings.

Figure 1:
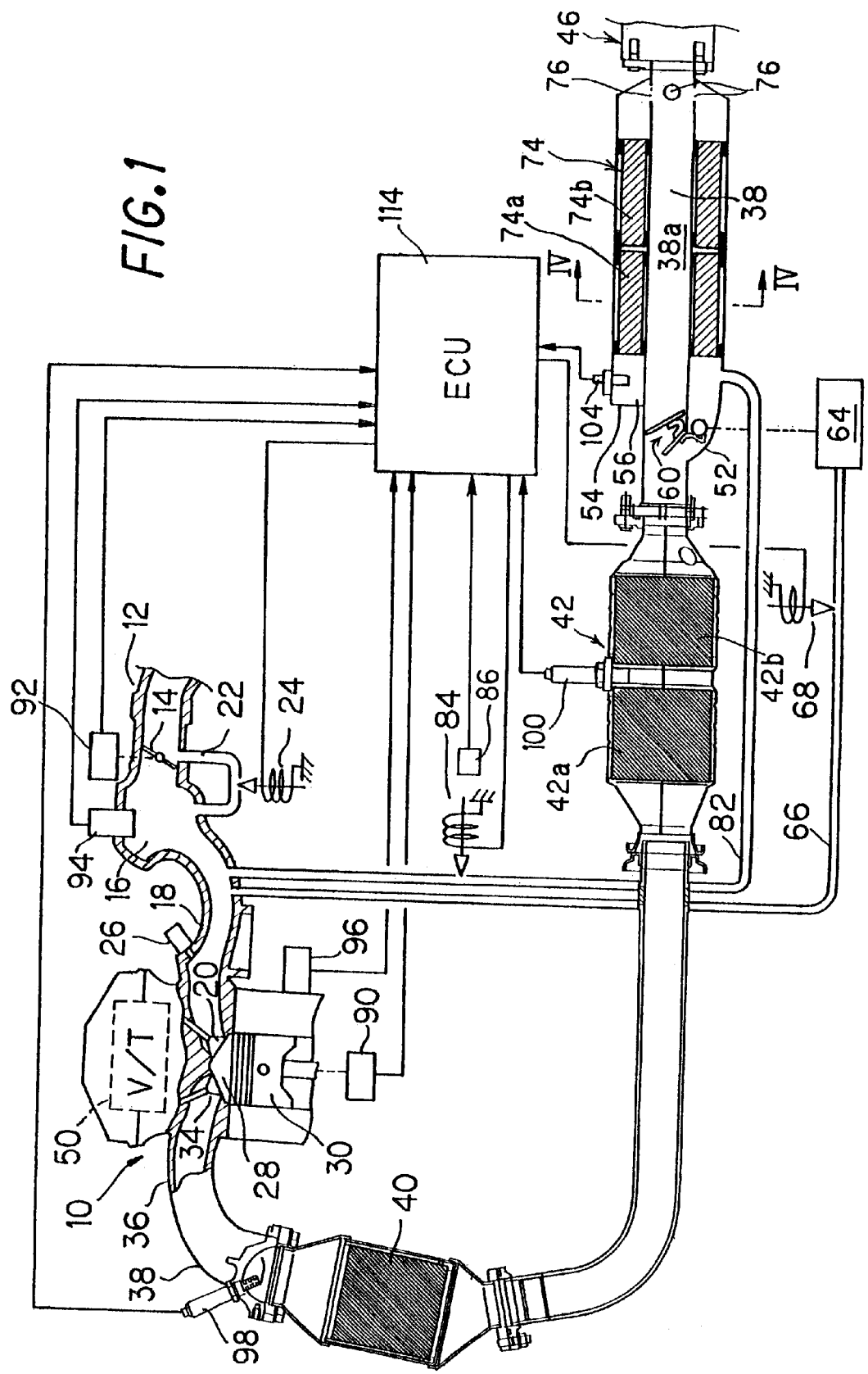
FIG. 1 is a schematic view showing the overall configuration of a degradation discrimination system of an internal combustion engine exhaust gas purification system according to a first embodiment of the invention.

FIG. 1 is a view schematically showing the overall configuration of a degradation discrimination system of an internal combustion engine exhaust gas purification system according to an embodiment of the invention.

Reference numeral 10 in this figure designates an overhead cam (OHC) in-line four-cylinder internal combustion engine. Air drawn into an air intake pipe or passage 12 through an air cleaner (not shown) mounted separately is supplied to the first to fourth cylinders (only one is shown) through a surge tank 16, an intake manifold 18 and two intake valves 20 (only one is shown), while the flow thereof is adjusted by a throttle valve 14 and is supplied to the first to four cylinders of the engine 10. The throttle valve 14 is bypassed by a bypass 22 provided at the air intake pipe 12. A valve (EACV) 24 comprised of an electromagnetic solenoid valve is installed in the bypass 22 for closing the same.

A fuel injector 26 is installed in the vicinity of the intake valves 20 of each cylinder for injecting fuel for the cylinder concerned. The injected fuel mixes with the intake air to form an air-fuel mixture that is supplied into a combustion chamber 28 and is compressed in the compression stroke and is ignited by a spark plug (not shown). The resulting combustion of the air-fuel mixture drives a piston 30 downwards.

The exhaust gas produced by the combustion is discharged through two exhaust valves 34 (only one is shown) into an exhaust manifold 36, from where it passes through an exhaust pipe or passage 38 to a first catalyst (catalytic converter) 40 installed immediately below the exhaust manifold 36 and a second catalyst 42 comprising a first catalyst bed 42a and a second catalyst bed 42b (all three-way catalytic converters) where noxious components are removed therefrom before it is discharged into the atmosphere via a vehicle rear assembly 46 including a muffler and a tail pipe (neither shown).

The engine 10 is equipped with a variable valve timing mechanism 50 (illustrated as "V/T" in FIG. 1). The variable valve timing mechanism 50 switches the opening/closing timing of the intake and/or exhaust valves between two types of timing characteristics in response to the engine speed NE and the engine load (e.g. the manifold absolute pressure PBA), i.e. a characteristic for low engine speed and a characteristic for high engine speed. The characteristics include one of the two intake valves being operated at a rest position.

The exhaust pipe 38 is connected to a chamber 54, cylindrical in shape, at a location downstream of the second catalyst 42. More specifically, the exhaust pipe 38 is branched off downstream of the second catalyst 42 to form a branch 52. The branch 52 is connected to the chamber 54 which is air-tightly connected to the exhaust pipe 38 to surround the same. With this passages for exhaust gas flow are formed; a main exhaust gas passage 38a passing through the inside of the exhaust pipe 38 and a bypass exhaust gas passage 56 passing through the branch 52 and the inner space of the chamber 54.

Figure 2:
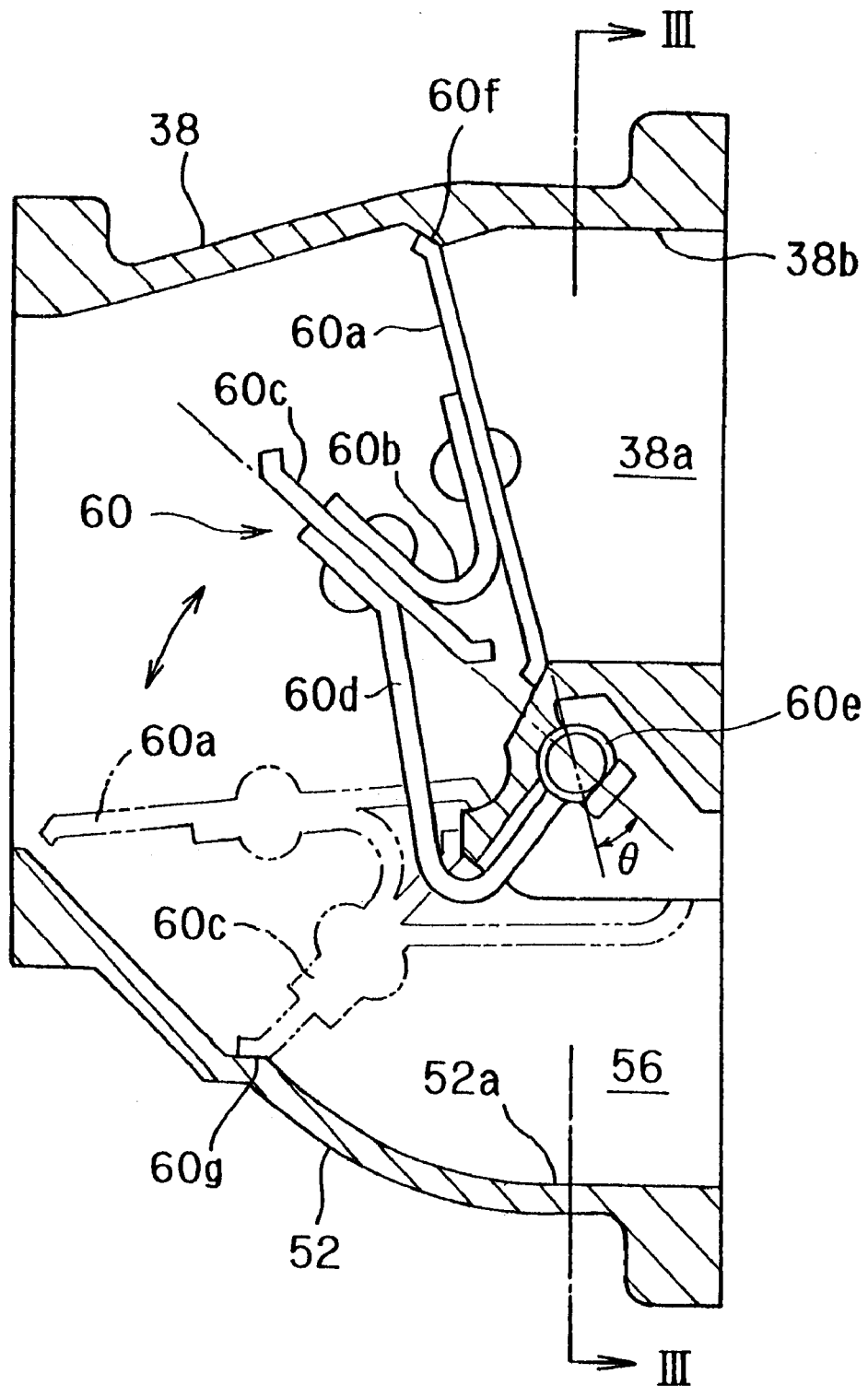
FIG. 2 is an enlarged sectional view of a switch-over valve illustrated in FIG. 1.

A switch-over valve 60 is provided in the vicinity of the branching point at the entrance of the chamber 54. FIG. 2 is an enlarged sectional view of the switch-over valve 60 and FIG. 3 is a sectional view taken along III—III of FIG. 2.

Figure 3:
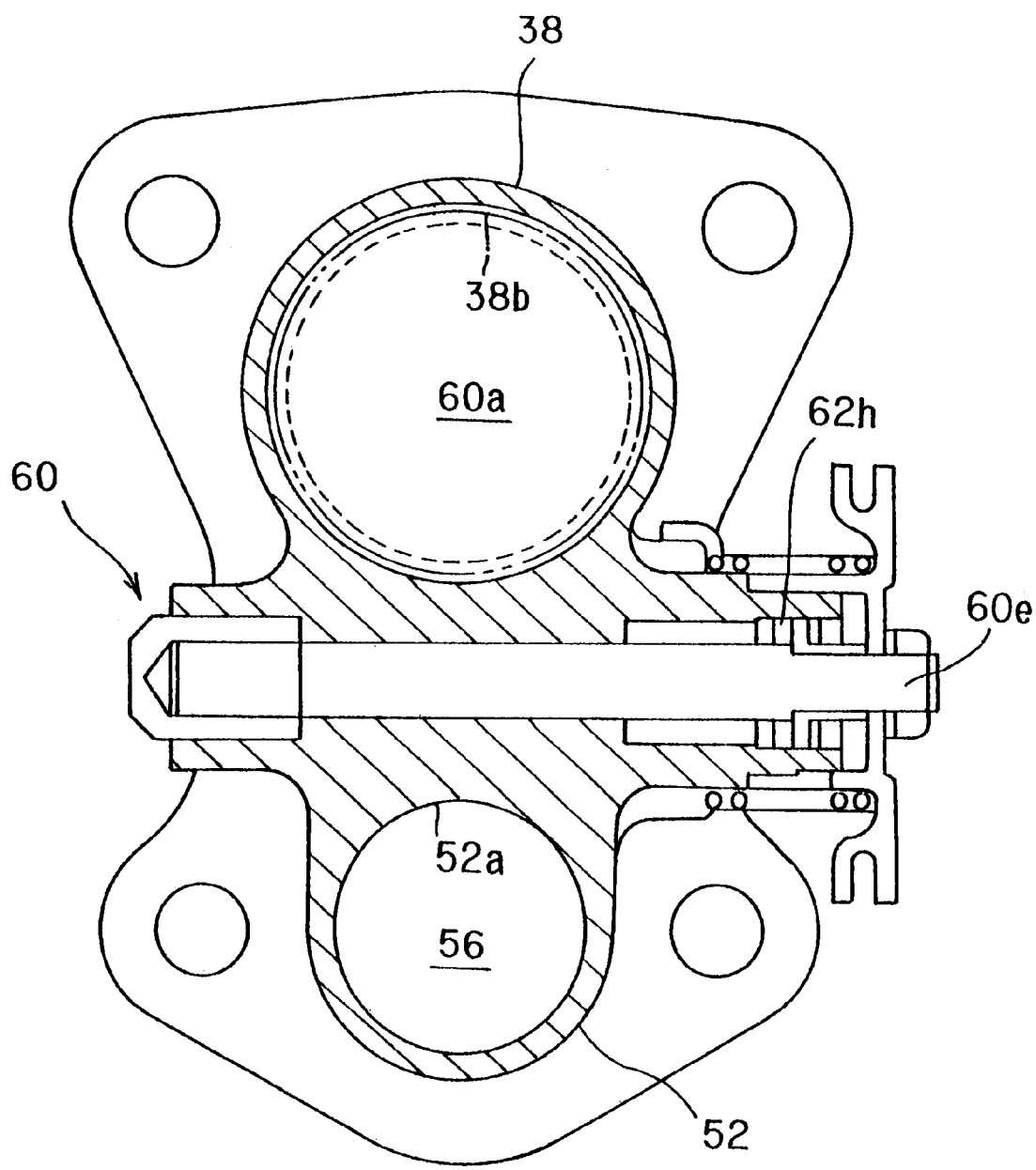
FIG. 3 is a sectional view taken along III—III of FIG. 2.

Explaining the switch-over valve 60 with reference to FIGS. 2 and 3, it comprises a first valve disc 60a which is greater in diameter than the exhaust pipe inner wall 38b defining the main exhaust gas passage 38a, and an arm 60b in an inverted-C shape which connects the first valve disc 60b with a second valve disc 60c which is greater than the diameter of the wall 52a of the branch 52 defining the bypass exhaust gas passage 56. A stem 60d is used to connect the second valve disc 60c to a shaft 60e.

As shown in FIG. 1, the shaft 60e is connected to a valve actuator 64. The valve actuator 64 has a conduit 66 which is connected to the air intake pipe 12 at a location downstream of the throttle valve 14. An electromagnetic solenoid valve (referred later as "TRPV") 68 is installed in the conduit 66, which opens the conduit 66 when energized to introduce the negative pressure therein.

Explaining the valve operation more specifically with reference to FIG. 2, the valve actuator 64 operates to rotate shaft 60e in the position shown by solid lines in the figure when the negative pressure is introduced such that the first valve disc 60a rests on a valve seat 60f to close the main exhaust gas passage 38a (in other words, it opens the bypass exhaust gas passage 56). On the other hand, when the TRPV 68 is deenergized, the conduit 66 is open to the air. As a result, the shaft 60e is returned to a position shown by phantom lines in the figure by a return spring (not shown) such that the second valve disc 60c rests on a valve seat 60g to close the bypass exhaust gas passage 56 (in other words, it opens the main exhaust gas passage 38a).

The second valve disc 60c (and the first valve disc 60a) can be at any position between those illustrated in FIG. 2 by solid lines and phantom lines, by regulating the amount of negative pressure introduced in the conduit by operating the TRPV 68 in such a way that the bypass exhaust gas passage 56 (and the main exhaust gas passage 38a) is opened by a slight amount.

As shown in FIG. 2, the first and second valve discs 60a, 60c are fixed to the shaft 60e at a predetermined angle θ in such a way, that when the first valve disc 60a closes the main exhaust gas passage 38a, the second valve disc 60c is lifted from the valve seat 60g so as not to block the exhaust gas flowing into the bypass exhaust gas passage 56, while, when the second valve disc 60c closes the bypass exhaust gas passage 56, the first valve 60a is lifted from the valve seat 60f so as not to block the exhaust gas flowing into the main exhaust gas passage 38a.

Returning to the explanation of FIG. 1, an adsorbent (HC adsorbing means or HC adsorbing catalyst) 74 is installed at the bypass exhaust gas passage 56 in the chamber 54. The adsorbent 74 comprises a first adsorbent bed 74a (provided upstream, i.e. at a position closer to the branch 52) and a second adsorbent bed 74b (provided downstream, i.e. at a position closer to the vehicle rear assembly 46).

Figure 4:
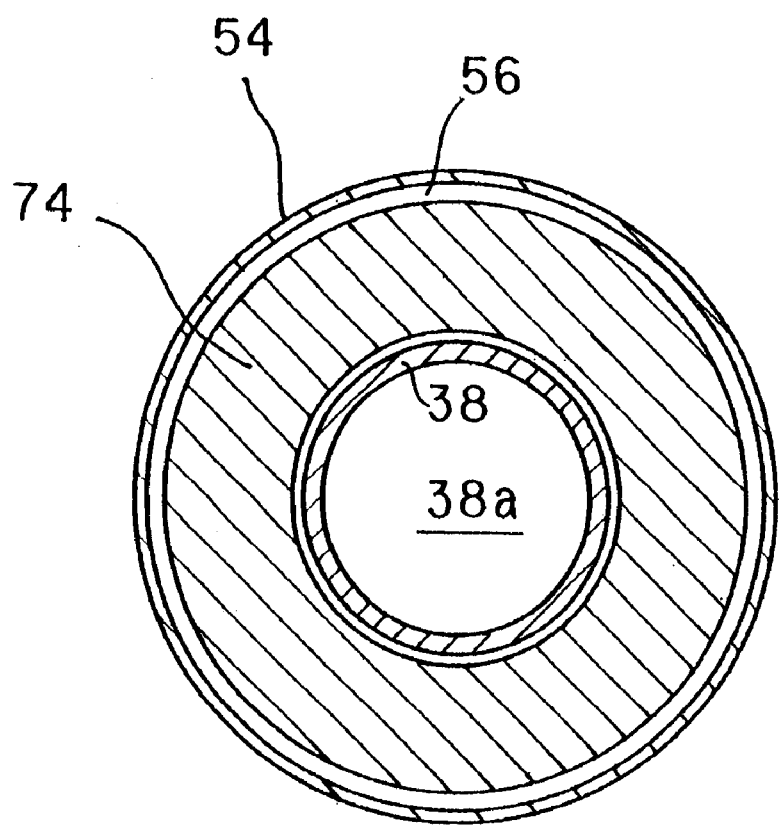
FIG. 4 is a sectional view taken along IV—IV of FIG. 1.

Specifically, as shown in FIG. 4, the chamber 54 is configured to be cylindrical in cross section such that it completely encircles the exhaust pipe 38. More specifically, the adsorbent 74 is positioned close to the exhaust pipe 38 in such a way that the temperature increase of the adsorbent 74 is promoted such that the adsorbed unburned component is desorbed as quickly as possible and is recirculated into the engine intake.

The adsorbent 74 preferably comprises a porous material having a large surface area such as zeolite (the general name of crystalline aluminosilicate or metallosilicate). The adsorbent made from zeolite has small pores or holes in it which are regular in shape and size. The pore sizes are different for different zeolites.

A pore size of 0.2 nm approximately corresponds to the molecular size of HC. The adsorbent made from zeolite adsorbs HC at a low temperature, less than 100° C. and desorbs the adsorbed HC at a higher temperature, ranging from 100° C. to 250° C. These temperatures are different for different kinds of HC (number of carbons) and increase with increasing number of carbons. Moreover, these temperatures vary depending on the kind of zeolites, also.

The adsorption is classified into two types, i.e. a mechanical adsorption caused by intermolecular attractions and a chemical adsorption caused by chemical bonds The adsorption in the zeolite adsorbent is mainly the mechanical one. In the mechanical adsorption, the kind (number of carbons) of HC to be adsorbed is determined by the pore size of zeolite constituting the adsorbent.

FIG. 5 is a chart showing the property of zeolites relative to HC compounds in five kinds (number of carbons). In the figure, the symbols indicate the ability of adsorption, i.e. ○: excellent; Δ: medium; ×: poor.

Thus, of the various zeolites, an appropriate zeolite or a combination of zeolites such as a combination of Ga-MFI and mordenite should preferably be selected as the adsorbent. Although not shown, some HC compounds such as methane ($CH_4$) will require other kind of zeolites having finer pores.

The adsorbent 74 should be prefabricated from a mixture of selected zeolite(s) and a catalyzer element in a honeycomb structure held in a specially designed metal casing. The adsorbent 74 made from any kind of zeolite exhibits an excellent heat proof (thermal stability) property and does not degrade or deteriorate under a high temperature if the temperature is less then 1100° C. or thereabout. The marginal temperature (beneath of which zeolite does not degrade) differs for different zeolites. If different zeolites are combined to be used, the combination will determine the marginal temperature.

Returning to the explanation of FIG. 1, the exhaust pipe 38 is provided near the end of the chamber 54 (close to the vehicle rear assembly 46) with four holes (confluence points) 76 which are circumferentially located at intervals of 90 degrees. The bypass exhaust gas passage 56 is thus formed from the branch 52 and extends into chamber 54 via the adsorbent 74 up to the holes 76 where it merges into the main exhaust gas passage 38a in the exhaust pipe 38.

The chamber 54 is connected, at or near the entrance, i.e., at a position upstream of the adsorbent 74 and close to the branch 52, to an EGR conduit (passage) 82. The EGR conduit 82 is connected, at the other end, to the air intake pipe 12 at a position downstream of the throttle valve 14. The EGR conduit 82 is provided with an EGR control valve (electromagnetic solenoid valve) 84 which closes the conduit 82 when made ON (energized). A lift sensor 86 is provided in the vicinity of the EGR control valve 84 and generates a signal indicative of the amount of lift (stroke) named "lact" of the valve 84. The lift amount indicates the opening degree of the valve 84.

The exhaust gas purification system comprises the adsorbent 74, the bypass exhaust gas passage 56, the switch-over valve 60, the valve actuator 64, the holes 76, the EGR conduit 82, the EGR control valve 84, etc.

The ignition distributor (not shown) of the engine 10 is provided with a crank angle sensor 90 which generates a signal indicative of Top Dead Center (TDC) of the piston 30 and a signal indicative of unit angles divided into smaller values. The engine 10 is further provided with a throttle position sensor 92 which generates a signal indicative of the degree of opening θ TH of the throttle valve 14, a manifold absolute pressure (MAP) sensor 94 which generates a signal indicative of the aforesaid manifold absolute pressure PBA of the intake manifold downstream of the throttle valve 14 in terms of absolute value and indicative of the engine load, and a coolant temperature sensor 96 installed in the vicinity of a coolant passage (not shown) of the engine which generates a signal indicative of the temperature TW of the engine coolant.

Further, an universal air/fuel ratio sensor 98 (named "LAF sensor") is provided in the exhaust pipe 38 at or downstream of a confluence point of the exhaust manifold 36 and upstream of the first catalyst 40, where it generates a signal indicative of the oxygen concentration in the exhaust gas, as explained later. In addition, an $O_2$ sensor 100 is installed in the exhaust pipe 38 at a location between the first catalyst bed 42a and the second catalyst bed 42b, which generates an ON/OFF signal each time the oxygen concentration in the exhaust gas changes from rich to lean and vice versa.

Furthermore, an HC sensor 104 is installed at the bypass exhaust gas passage 56 in the chamber 54, more precisely at a location upstream (close to the entrance of the chamber 52) and generates a signal indicative of the concentration of HC (hereinafter referred to as "trs.hc") in the exhaust gas flowing in the bypass exhaust gas passage 56 and into the adsorbent 74. The HC sensor 104 is, for example, a threshold current type sensor made from a solid-electrolyte comprising some kinds of barium oxides, as disclosed in Japanese Laid-Open Patent Application No. Hei 10 (1998)-300, 718.

Furthermore, a valve timing sensor (not shown) is provided in a hydraulic pressure circuit (not shown) of the variable valve timing mechanism 50 and generates a signal indicating which characteristic is selected.

These output signals generated by the sensors are forwarded to an Electronic Control Unit (ECU) 114 comprising a microcomputer.

Figure 6:
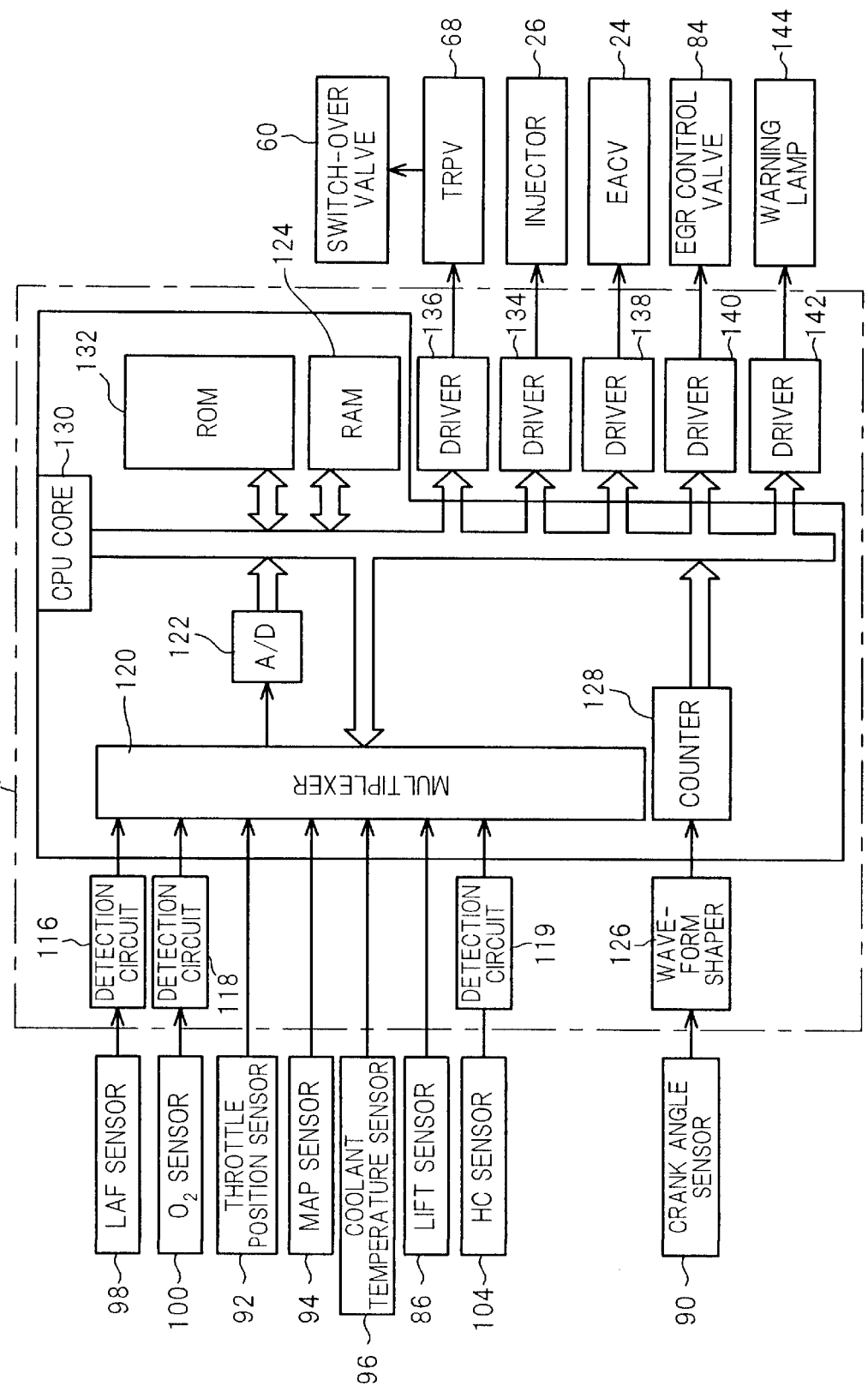
FIG. 6 is a block diagram showing the details of an Electronic Control Unit (ECU) illustrated in FIG. 1.

Details of the ECU 114 are shown in the block diagram of FIG. 6.

The output of the LAF sensor 98 is received by a first detection circuit 116, where it is subjected to appropriate linearization processing for producing an output characterized in that it varies linearly with the oxygen concentration of the exhaust gas over a broad range extending from lean to rich. The output of the $O_2$ sensor 100 is input to a second detection circuit 118 which generates a switching signal indicating that the air/fuel ratio in the exhaust gas emitted from the engine 10 is rich or lean with respect to the stoichiometric air/fuel ratio. The output of the HC sensor 104 is input to a third detection circuit 119 which generates a signal indicative of the concentration of HC in the exhaust gas.

The output of these detection circuits 116, 118, 119 are forwarded through a multiplexer 120 and an A/D converter 122 to a RAM (random access memory) 124 in a CPU (central processing unit). Specifically, the CPU has a CPU core 130, a ROM (read-only memory) 132 and the RAM 124, and the output of the detection circuits 116, 118, 119 are A/D-converted and stored in buffers of the RAM 124. The outputs of the analog sensors including the throttle position sensor 92 are similarly input to the CPU via the A/D converter 122 to the RAM 124.

The output of the crank angle sensor 90 is shaped by a wave-form shaper 126 and has its output value counted by a counter 128. The count is inputted into the CPU and the engine speed NE is detected or calculated from the count. In accordance with commands stored in the ROM 132, the CPU core 130 computes a manipulated variable including a basic fuel injection amount TI and an output fuel injection amount TOUT obtained by correcting TI and drives the fuel injectors 26 of the respective cylinders via a driver 134.

The CPU core 130 also drives, via a driver 136, through the electromagnetic valve (TRPV) 68 and the valve actuator 64 (not shown in FIG. 6) to operate the switch-over valve 60, and the CPU core 130 further discriminates whether the adsorbent 74 has degraded or deteriorated.

Furthermore, the CPU core 130 drives the EACV 24 and the EGR control valve 84 through drivers 138, 140. Moreover, the CPU core 130 lights a warning lamp 144 (not shown in FIG. 1) through a driver 142.

Before entering into the operation of the degradation discrimination system of an internal combustion engine exhaust gas purification system according to the embodiment, the operation of the exhaust gas purification system using the adsorbent 74 will be described with reference to FIG. 7.

Figure 7A:
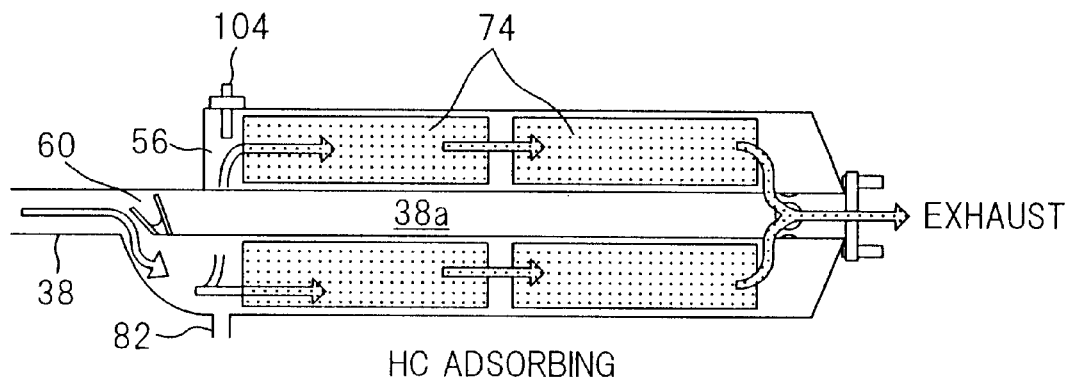
FIGS. 7A–7C are views showing the operation of the exhaust gas purification system including the adsorbent illustrated in FIG. 1.

In the exhaust gas purification system illustrated in the figure, when the engine 10 is cold-started, the switch-over valve 60 is kept in the position shown by the solid lines in FIG. 2 for a predetermined period of time (e.g., 40 sec.) since engine starting such that the main exhaust gas passage 38a is closed, while the bypass exhaust gas passage 56 is opened, as illustrated in FIG. 7A.

Since the first and second catalysts 40, 42 provided upstream of the adsorbent 74 have not been activated during the aforesaid period of time when the engine 10 was cold-started, the exhaust gas is not purified by the catalysts 40, 42. The exhaust gas flows through the bypass exhaust gas passage 56, as shown by arrows in FIG. 7A, and the unburned HC component is adsorbed by the adsorbent 74.

Figure 7B:
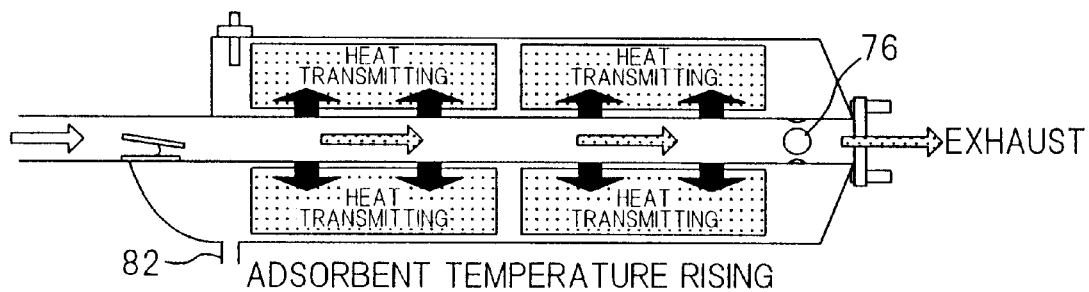

As the upstream catalysts 40, 42 are normally activated after a lapse of the predetermined period of time, the switch-over valve 60 is driven to the position shown by phantom lines in FIG. 2 such that the main exhaust gas passage 38a is opened, while the bypass exhaust gas passage 56 is closed, as illustrated in FIG. 7B.

Accordingly, the exhaust gas purified by the upstream catalysts 40, 42 flows through the main exhaust gas passage 38a and heats the adsorbent 74. As a result, the unburned HC component adsorbed by the adsorbent 74 begins to desorb. Since the pressure of the exhaust gas flowing through the main exhaust gas passage 38a is greater than that flowing through the bypass exhaust gas passage 56, a part or portion of the exhaust gas enters the bypass exhaust gas passage 56 through the holes 76.

Figure 7C:
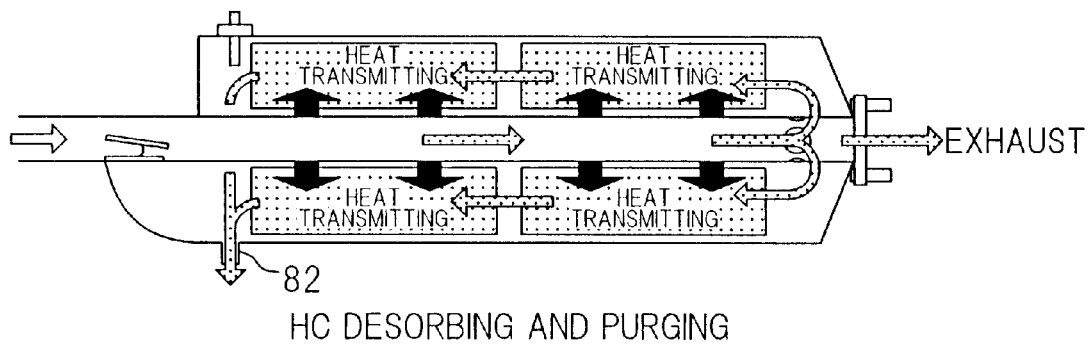

Then as illustrated in FIG. 7C, the desorbed unburned HC component is recirculated back to a position upstream of the first and second catalysts 40, 42, more specifically to the engine intake system through the EGR conduit 82, when the EGR is conducted. At this time, a part or portion of the exhaust gas flowing through the main exhaust gas passage 38a is sucked in by the negative pressure generated at the engine intake system and enters the bypass exhaust gas passage 56 through the holes 76.

The introduced exhaust gas flows through the bypass exhaust gas passage 56 in a direction opposite to that of the exhaust gas flowing through the main exhaust gas passage, while accelerating or expediting the heating of the adsorbent 74, and is recirculated into the engine intake system to be burned once again. The exhaust gas generated by this re-burning is purified by the upstream catalysts 40, 42 and flows out of the engine 10 through the main exhaust gas passage 38a. The concentration of HC flowing into the adsorbent 74 is monitored by the HC sensor 104.

Based on the above, the mode of operation of the degradation discrimination system of an internal combustion engine exhaust gas purification system according to the embodiment of the invention will be explained.

Figure 8:
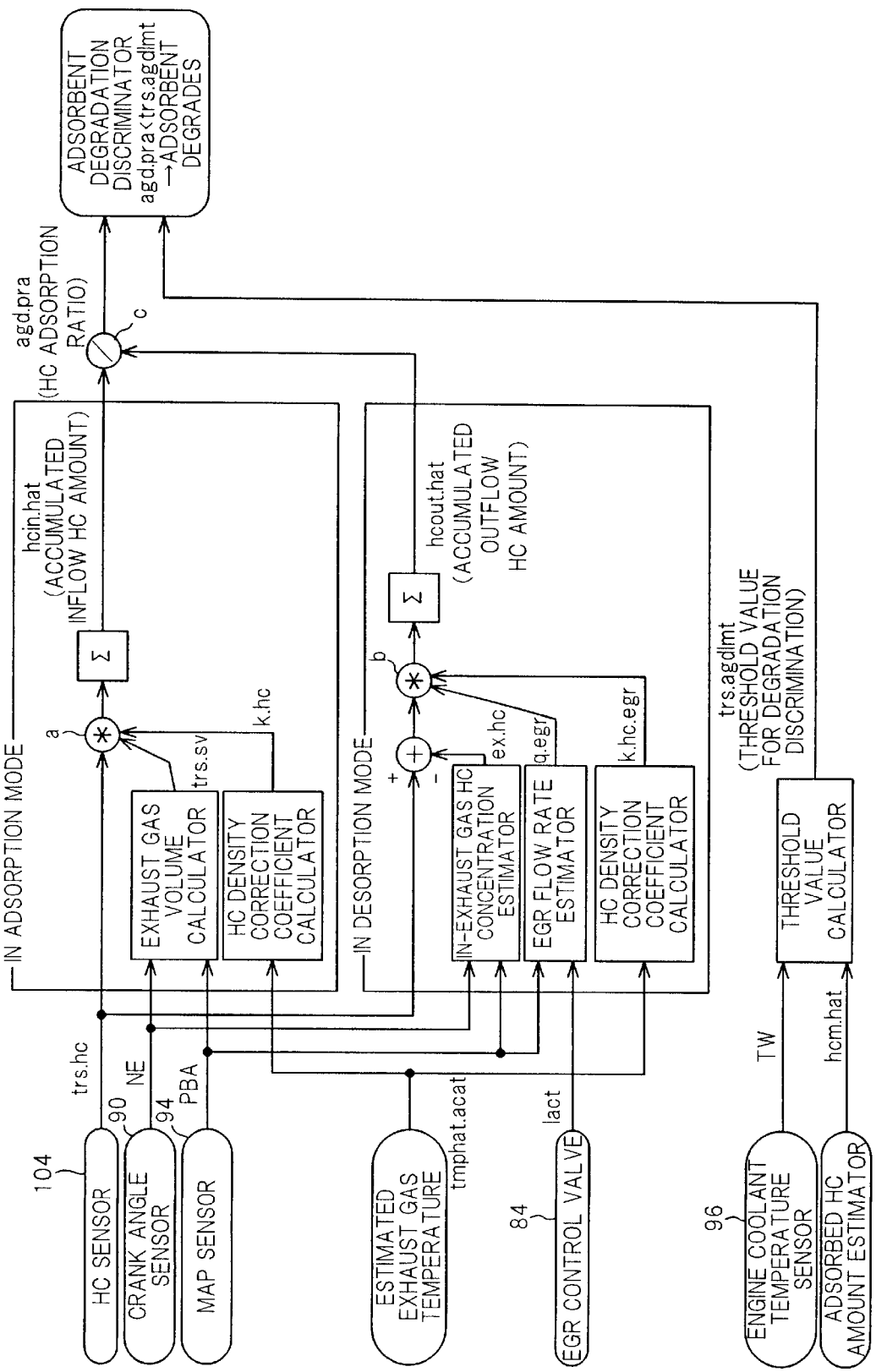
FIG. 8 is a block diagram showing the operation of the degradation discrimination system of an internal combustion engine exhaust gas purification system according to the first embodiment illustrated in FIG. 1.
Figure 9:
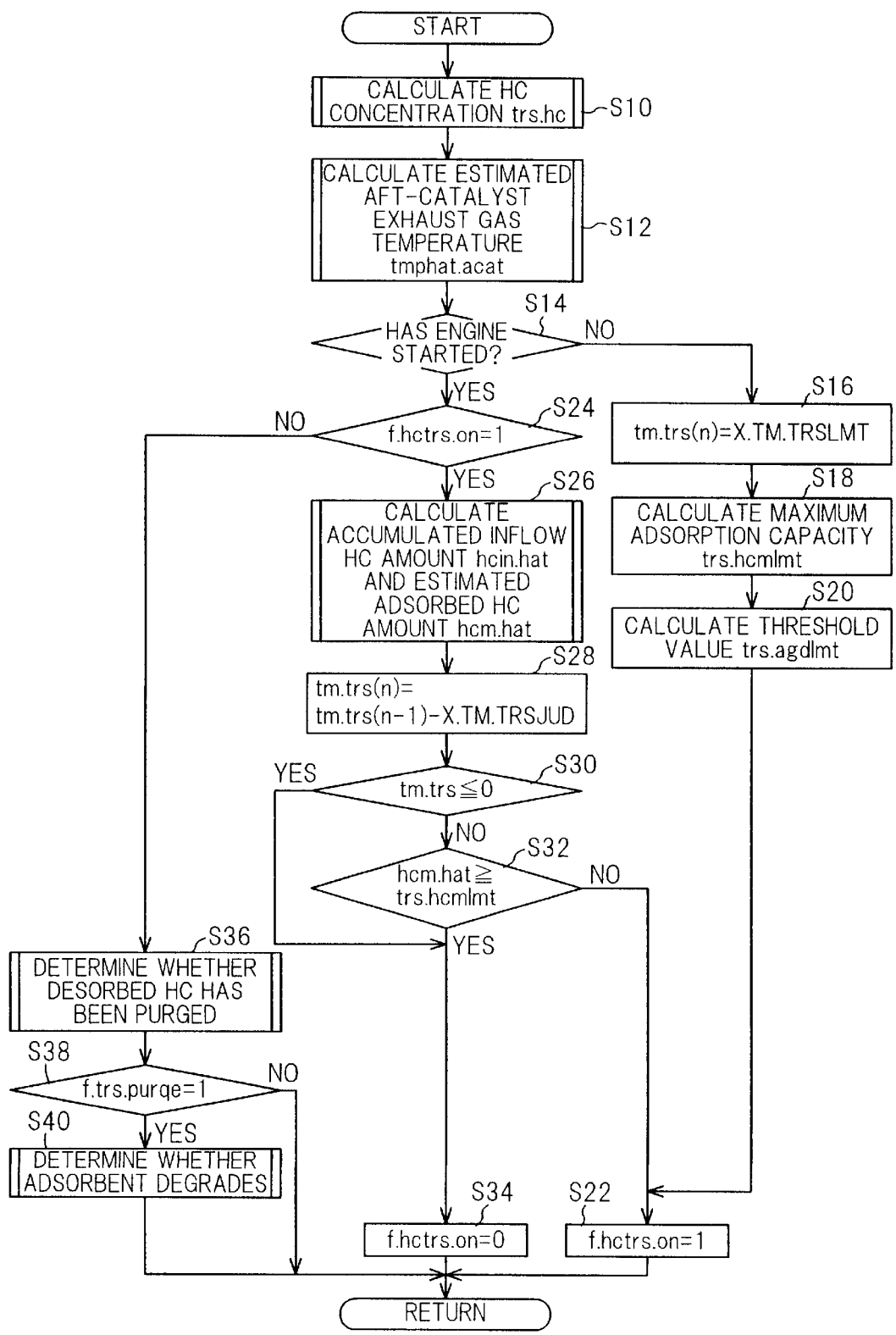
FIG. 9 is a flow chart similarly showing the operation of the system illustrated in FIG. 1.

FIG. 8 is a block diagram and FIG. 9 is a flow chart both showing the operation of the system.

Outlining the operation with reference to FIG. 8, in the operation of the system, more precisely in the discrimination of degradation of the adsorbent 74, the determined (detected) HC concentration trs.hc is multiplied at a multiplier stage a by an exhaust gas volume (mass) (hereinafter referred to as "trs.sv") and an HC density correction coefficient (hereinafter referred to as "k.hc"). The exhaust gas volume trs.sv is determined based on the detected engine speed NE and the engine load (e.g. the manifold absolute pressure PBA). The HC density correction coefficient k.hc (adjusting for the volume from density) is determined based on an estimated exhaust gas temperature (named "tmphat.a-cat" and hereinafter referred to also as an aft-catalyst exhaust gas temperature).

The resulting product is then accumulated (summed) to determine an accumulated inflow HC amount (mass) (hereinafter referred to as "hcin.hat"). This amount hcin.hat indicates the total amount or sum of HC flowing in the bypass exhaust gas passage 56 and into the adsorbent 74 in the adsorption mode.

Parallel with the above, an in-exhaust gas HC concentration (hereinafter referred to as "ex.hc") is estimated and the estimated value is subtracted from the HC concentration trs.hc. Then, the resulting difference is multiplied at a multiplier stage b by an EGR flow rate (exhaust gas recirculated amount; hereinafter referred to as "q.egr") and an HC density correction coefficient during EGR (hereinafter referred to as "k.hc.egr"). The in-exhaust gas HC concentration ex.hc is estimated based on the engine speed NE and the engine load (e.g. the manifold absolute pressure PBA). The EGR flow rate (exhaust gas recirculated amount) q.egr is determined based on the engine load (e.g. manifold absolute pressure PBA) and the EGR control valve lift amount lact. The HC density correction coefficient during EGR k.hc.egr is similarly determined based on the estimated exhaust gas temperature tmphat.acat.

The resulting product is then accumulated (summed) to determine an accumulated outflow HC amount (mass) (hereinafter referred to as "hcout.hat"). This amount hcout.hat indicates the total amount or sum of HC desorbing from the adsorbent 74 and flowing out of the bypass exhaust gas passage 56 in the desorption mode.

Then, the accumulated inflow HC amount hcin.hat is divided by the accumulated outflow HC amount hcout.hat at a divider stage c to determine a ratio therebetween. This ratio is hereinafter referred to as "HC adsorption ratio agd.pra".

Parallel with the above, a threshold value for discrimination degradation (hereinafter referred to as "trs.agdlmt") is determined based on the engine coolant temperature TW and an estimated adsorbed HC amount (named "hcm.hat"). The HC adsorption ratio agd.pra is compared with the threshold value trs.agdlmt and when the HC adsorption ratio agd.pra is less than the threshold value trs.agdlmt, it is discriminated that the adsorbent 74 has degraded or deteriorated. Here, the words that "the adsorbent 74 has degraded or deteriorated" indicates that the adsorption capacity or ability of the adsorbent has degraded or deteriorated.

The above will be explained in detail with reference to the flow chart of FIG. 9. The program in FIG. 9 is executed when the ignition switch (not shown) is made on and is looped once every 100 msec.

The program begins at S10 in which the HC concentration trs.hc is determined or calculated.

Figure 10:
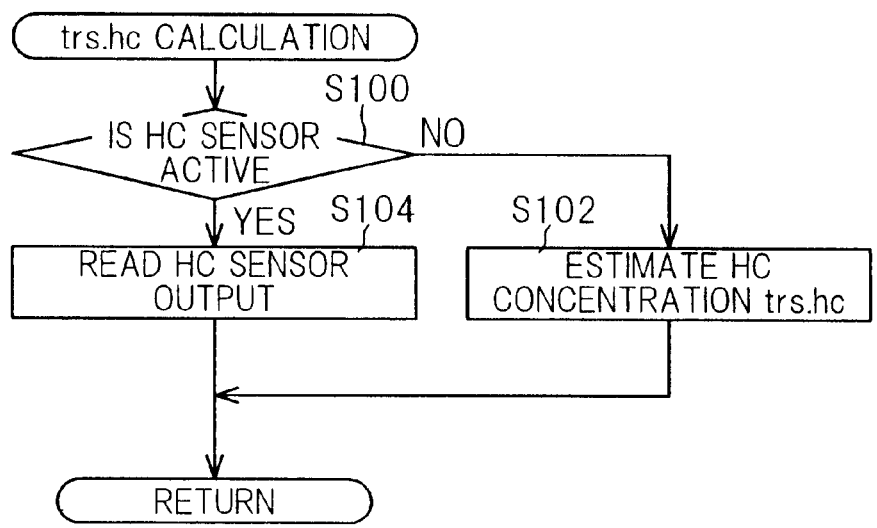
FIG. 10 is a flow chart showing the subroutine for determining an HC concentration referred to in the flow chart of FIG. 9.

FIG. 10 is a flow chart showing the subroutine for this determination.

The program begins in S100 in which it is determined whether the HC sensor 104 is active. Since the HC sensor 104 is not activated until the ambient temperature rises to a predetermined value, this is done by measuring time lapse since engine starting and when the measured time has not reached a prescribed time, it is determined that the HC sensor 104 is not active.

Figure 11:
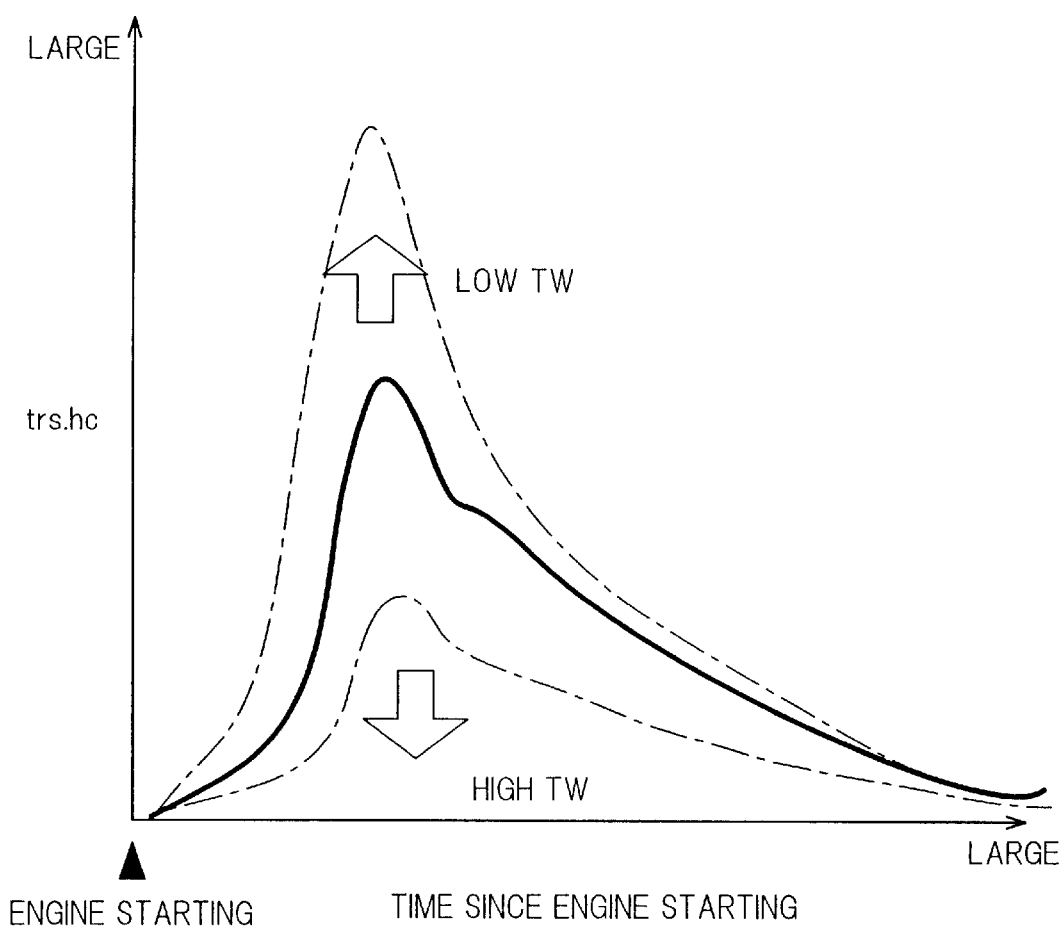
FIG. 11 is a graph showing characteristics of the HC concentration referred to in the flow chart of FIG. 9.

When the result in S100 is negative, the program proceeds to S102 in which the HC concentration trs.hc is estimated (calculated) by retrieving mapped data (whose characteristics are shown in FIG. 11) using the measured time since engine starting and the detected engine coolant temperature TW as address data.

To be more specific, the HC concentration trs.hc is retrieved using a characteristic shown by a solid line in the figure when the detected engine coolant temperature TW is within a range. On the other hand, trs.hc is retrieved using upper characteristics shown by phantom lines when the detected engine coolant temperature TW is out of the range in the lower direction, while trs.hc is retrieved using lower characteristics shown by phantom lines when the detected engine coolant temperature TW is out of the range in the higher direction.

In the characteristics shown in FIG. 11, the reason why hc.trs is set to be larger at a low TW than that at a high TW, is that, the amount of HC (i.e. HC concentration) in the exhaust gas increases when the engine 10 is cold. And the reason why the characteristics generally decrease with increasing measured time, is to make the degree of activation in the first and second catalysts 40 and 42 to be reflected in the determination. Thus, since the substitute value is calculated in S102 when the result in S100 is negative, the influence of inactiveness of the HC sensor 104 can be reduced as least as possible.

On the other hand, when the result in S100 is affirmative, the program proceeds to S104 in which the HC concentration trs.hc is simply determined by reading the output of the HC sensor 104.

Returning to the explanation of FIG. 9, the program proceeds to S12 in which an estimated exhaust gas temperature tmphat.acat is determined or calculated. Since this value tmphat.acat indicates the estimated temperature downstream of the first and second catalysts 40, 42, this value tmphat.acat is named "estimated aft-catalyst exhaust gas temperature".

Figure 12:
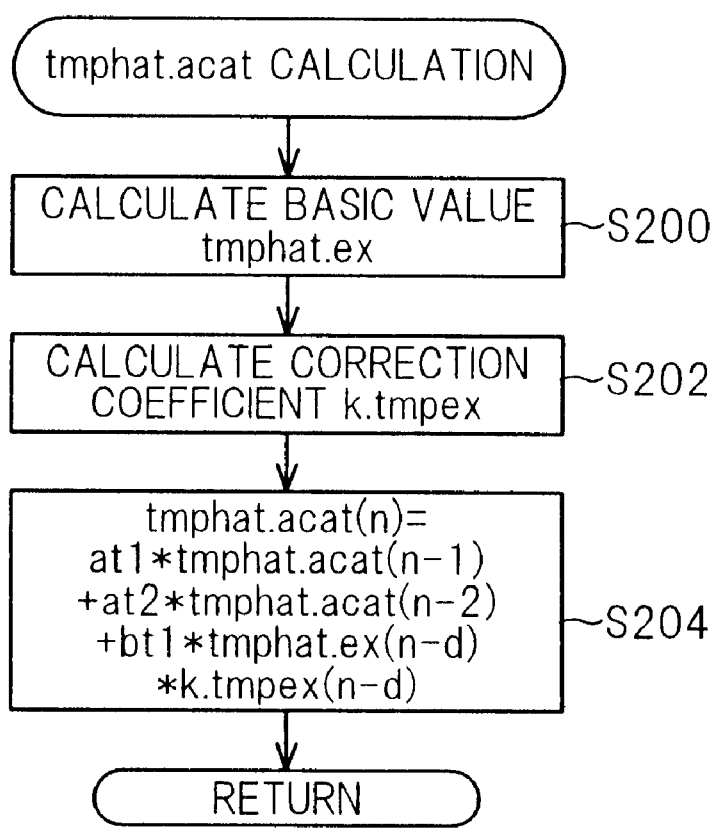
FIG. 12 is a flow chart showing the subroutine for estimating an exhaust gas temperature referred to in the flow chart of FIG. 9.

FIG. 12 is a flow chart showing the determination of this.

Figure 13:
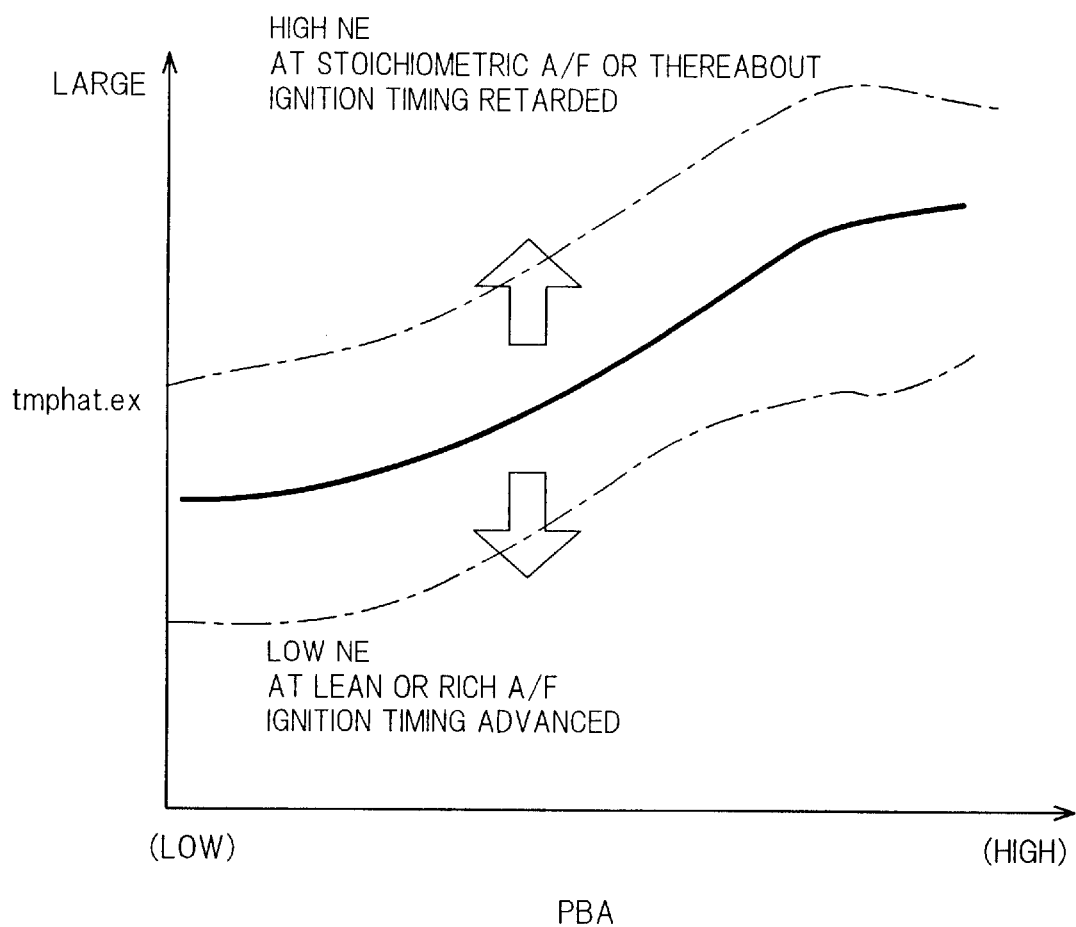
FIG. 13 is a graph showing characteristics of a basic value of the temperature referred to in the flow chart of FIG. 12.

The program begins in S200 in which a basic value thereof (named "tmphat.ex") is determined or calculated. Specifically, this is done by retrieving mapped data (whose characteristics are shown in FIG. 13) using the detected engine load (e.g. manifold absolute pressure PBA), the detected engine speed NE, the air/fuel ratio being operated, the ignition timing, etc. as address data.

More specifically, tmphat.ex is retrieved using a characteristic shown by a solid line in the figure when the detected engine speed NE is within a range. On the other hand, tmphat.ex is retrieved using upper characteristics shown by phantom lines when the detected engine speed NE is out of the range in the higher direction, or when the air/fuel ratio being operated is at the stoichiometric air/fuel ratio or thereabout, or when the ignition timing is retarded. Otherwise tmphat.ex is retrieved using lower characteristics shown by phantom lines.

It should be noted here that, if the engine 10 was a direct injection spark ignition engine in which gasoline is directly injected into the combustion chamber, the fuel injected in the intake stroke generates a pre-mixture combustion, while that in the compression stroke generates a stratified combustion. Thus, since the form of combustion is different with the fuel injection timing in the direct injection spark ignition engine, it would alternatively be possible to change the characteristics by the form of combustion when the engine 10 was a direct injection spark ignition engine.

In the flow chart of FIG. 12, the program then proceeds to S202 in which a post-engine-starting exhaust gas temperature correction coefficient (named "k.tmpex") is determined or calculated. This is done by retrieving mapped data (whose characteristics are shown in FIG. 14) using the measured time since engine starting and the detected engine coolant temperature TW as address data.

Specifically, k.tmpex is retrieved using a characteristic shown by a solid line in the figure when the detected engine coolant temperature TW is within a range. On the other hand, k.tmpex is retrieved using lower characteristics shown by phantom lines when the detected engine coolant temperature TW is out of the range in the lower direction, while k.tmpex is retrieved using upper characteristics shown by phantom lines when the detected engine coolant temperature TW is out of the range in the higher direction.

Figure 14:
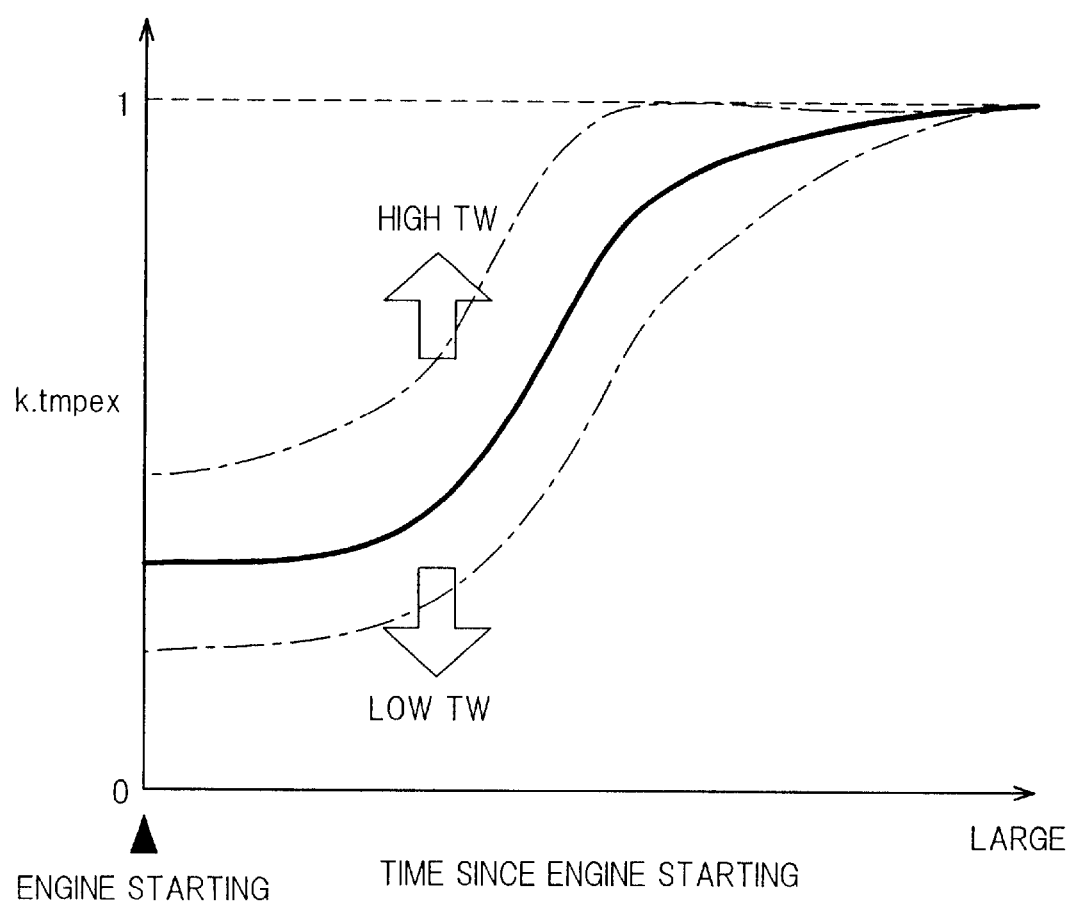
FIG. 14 is a graph showing characteristics of a correction coefficient of the temperature referred to in the flow chart of FIG. 12.

In the characteristics shown in FIG. 14, the reason why k.tmpex is set to be smaller at a low TW than that at a high TW, is that, since the engine temperature is low at a low engine coolant temperature TW such that the heat generated by the exhaust gas is immediately emitted from the engine 10, the exhaust gas temperature drops accordingly.

The program then proceeds to S204 in which the aft-catalyst exhaust gas temperature t\mphat.acat is estimated or determined using a dynamic model described by an equation shown there.

In the equation, the suffix "n" represents a sampling number in the discrete-time system, specifically, the time at which the program of FIG. 9 flow chart is executed, more specifically, (n) indicates the current program-execution-time and (n-m) indicates the program-execution-time m-time earlier. For brevity, addition of (n) to values at the current time is often omitted.

Figure 15:
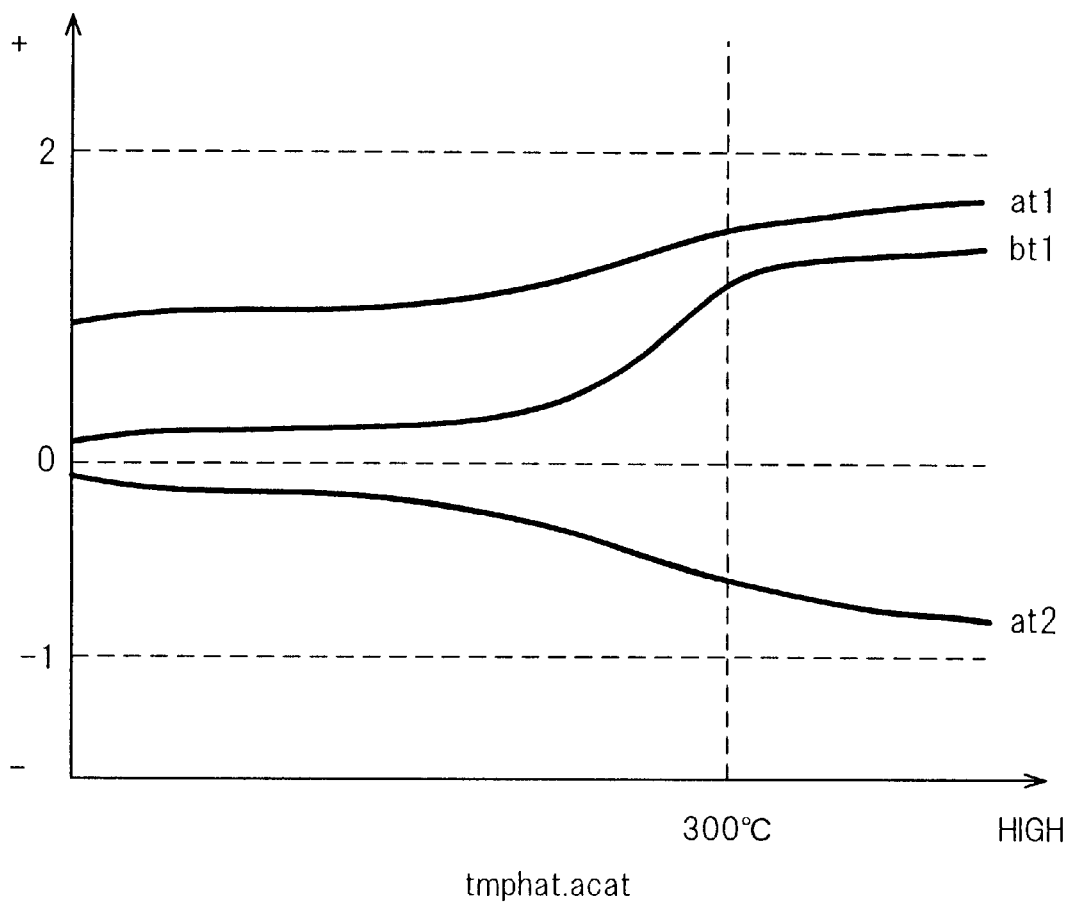
FIG. 15 is a graph showing characteristics of coefficients to be used in the determination of the temperature referred to in the flow chart of FIG. 12.

Further, in the equation, "d" indicates a dead time. And, values "at1", "at2" and "bt1" indicate coefficients and are determined as values ranging from −1 to +2 by retrieving data from a table (whose characteristics are shown in FIG. 15) using the estimated aft-catalyst exhaust gas temperature tmphat.acat, more precisely its last valve tmphat.acat(n−1) as address data.

The exhaust gas temperature downstream of the catalysts 40, 42 is thus estimated or calculated using a dynamic model constituted as a DARX model (auto-regressive model having a dead time in its input), in view of the dynamics of the catalysts 40, 42 including heat absorption, the degree of activation and temperature change.

Again returning to the explanation of FIG. 9, the program proceeds to S14 in which it is determined whether the engine 10 has started. This is done by determining whether the engine 10 has started cranking and the fuel injection has been started. If the cranking has started, but the fuel injection has not, it is determined that the engine 10 has not started.

The result in S14 is normally negative in the first program loop and the program proceeds to S16 in which a post-engine-starting timer (down counter, named as "tm.trs" which measures the aforesaid time lapse since engine starting) is set with a predetermined value X.TM.TRSLMT (a value corresponding to 40 sec. for example). It should be noted, that a value or parameter having the prefix "X" in this specification and corresponding figures indicates a predetermined value or parameter.

Figure 16:
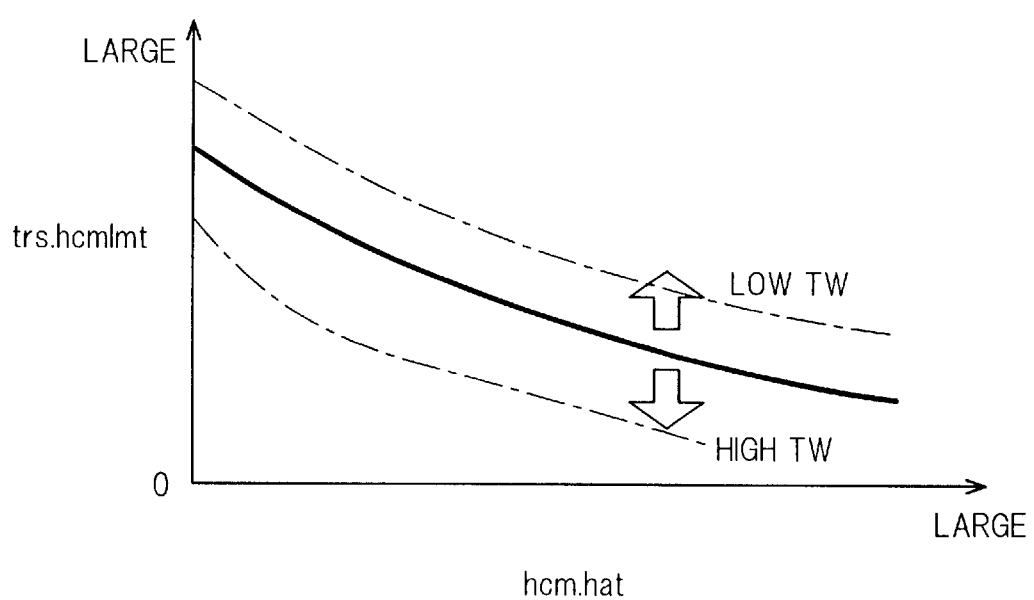
FIG. 16 is a graph showing characteristics of a maximum adsorption capacity referred to in the flow chart of FIG. 9.

The program then proceeds to S18 in which a maximum adsorption capacity (named as "trs.hcmlmt") is determined or calculated. This is done by retrieving mapped data (whose characteristics are shown in FIG. 16) using the estimated adsorbed HC amount hcm.hat (more precisely, the final value at last engine running) and the detected engine coolant temperature TW as address data. To be more specific, the maximum amount which the adsorbent 74 can adsorb at this time (trs.hcmlmt) is determined based on the HC amount adsorbed in the adsorbent 74.

Since the maximum adsorption capacity trs.hcmlmt varies with the temperature of the adsorbent 74, instead of the adsorbent temperature, the engine coolant temperature TW is used. Specifically, trs.hcmlmt is retrieved using a characteristic shown by a solid line in FIG. 16 when the detected engine coolant temperature TW is within a range. On the other hand, when the detected engine coolant temperature TW is out of the range, trs.hcmlmt is retrieved using an upper characteristic or a lower characteristic shown by phantom lines depending on the direction in which the detected engine coolant temperature TW is out of the range.

In the characteristics shown in FIG. 16, the reason why trs.hcmlmt is set to be larger at a low TW than that at a high TW, is that the adsorbent temperature is low when the engine 10 is cold and hence trs.hcmlmt tends to increase at a low temperature.

Figure 17:
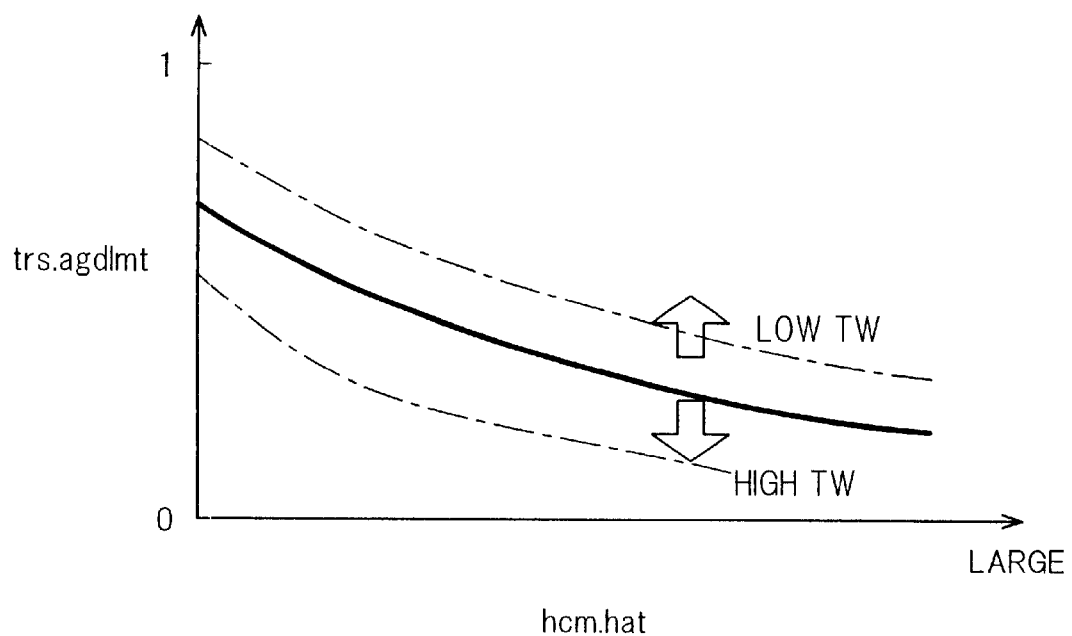
FIG. 17 is a graph showing characteristics of a threshold value (for degradation discrimination) referred to in the flow chart of FIG. 9.

The program proceeds to S20 in which the threshold value (for degradation discrimination) trs.agdlmt is determined or calculated. This is done by retrieving mapped data (whose characteristics are shown in FIG. 17) using the estimate adsorbed HC amount hcm.hat (more precisely, the final value at last engine running) and the detected engine coolant temperature TW as address data. Since the value trs.agdlmt also varies with the temperature of the adsorbent 74, instead of the adsorbent temperature, the engine coolant temperature TW is used and one from among three kinds of characteristics is selected based on the engine coolant temperature TW such that trs.agdlmt is retrieved using the selected characteristic.

The program then proceeds to S22 in which it is determined whether the bit of a flag f.hctrs.on is set to 1. To set the bit of the flag to 1 indicates to issue the instruction to operate the switch-over valve 60 such that the bypass exhaust gas passage 56 is opened, while to reset it to 0 indicates to generate the instruction to operate the valve 60 such that the bypass exhaust gas passage 56 is closed. In S22, the instruction is generated to operate the switch-over valve 60 to open the bypass exhaust gas passage 56 to begin the HC adsorption and enters the adsorption mode. The operation of the switch-over valve 60 itself is conducted by the ECU 114 in a routine (not shown).

When the result in S14 is affirmative in the next or later program loop, as this means that the engine 10 has started, the program proceeds to S24 in which it is determined whether the flag f.hctrs.on is set to 1, more precisely it is in the adsorption mode. The result is normally affirmative in the first program loop, the program proceeds to S26 in which the accumulated inflow HC amount hcin.hat and an estimated adsorbed HC amount hcm.hat are determined or calculated.

Figure 18:
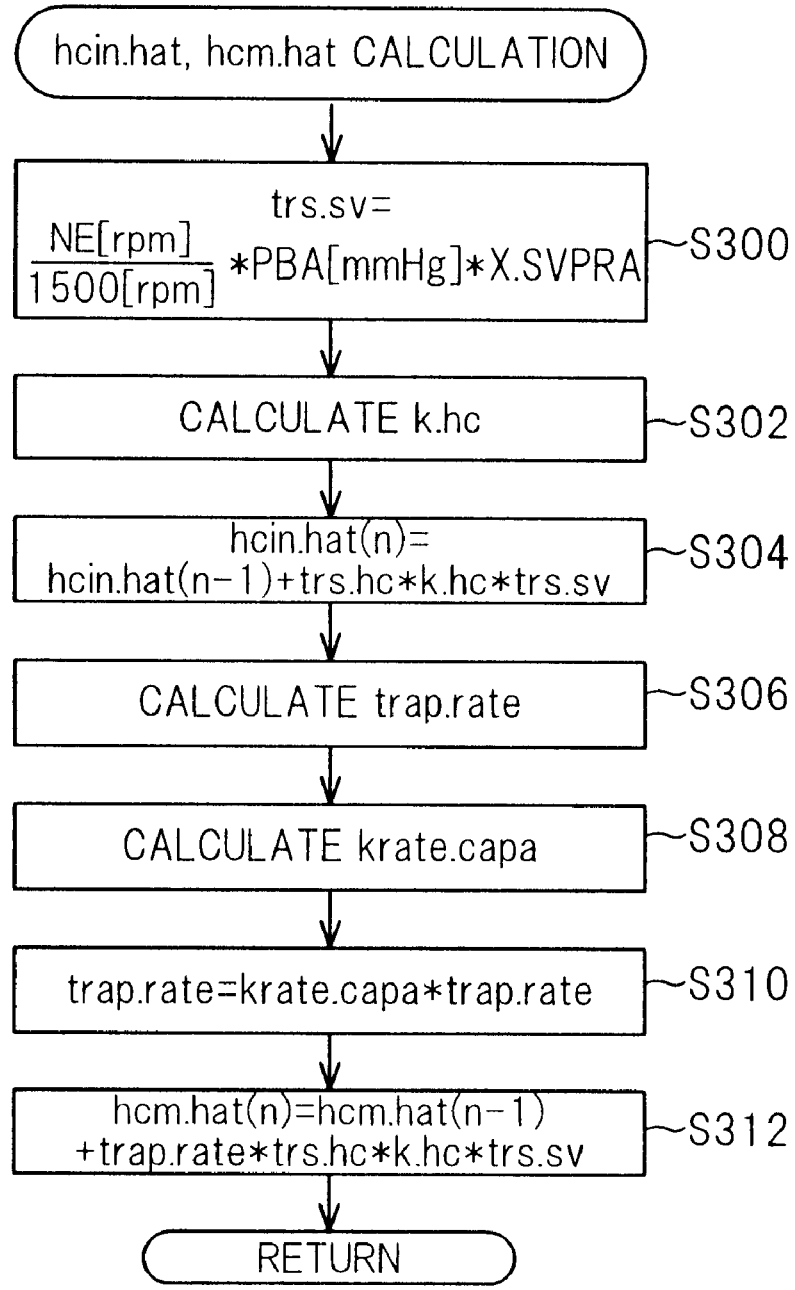
FIG. 18 is a flow chart showing the subroutine for determining an accumulated inflow HC amount and for estimating an HC adsorbed HC amount referred to in the flow chart of FIG. 9.

FIG. 18 is a flow chart showing the subroutine for the determination of these parameters.

The program begins in S300 in which the exhaust gas volume (named "trs.sv") in terms of a space velocity through the adsorbent, is estimated or determined using an equation illustrated there. The equation is an approximation using a value X.SVPRA. The value X.SVPRA is, for example, 65.74 assuming that the displacement volume of the engine 10 is 2.2 liters. The exhaust gas volume trs.sv may alternatively be estimated based on another equation using the engine speed NE and the fuel injection amount TI.

Figure 19:
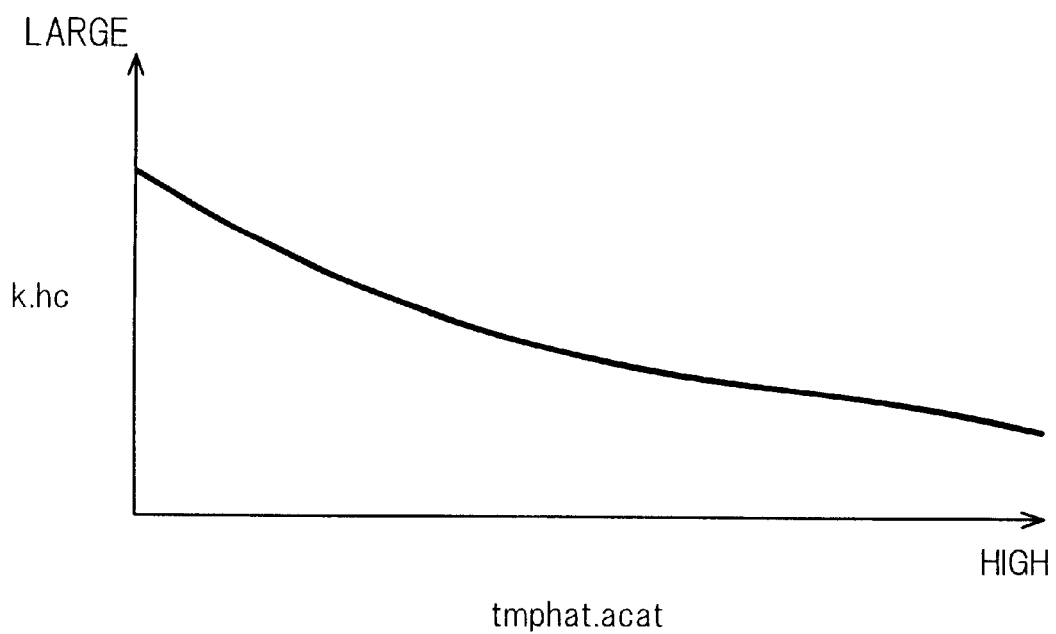
FIG. 19 is a graph showing a characteristic of an HC density correction coefficient referred to in the flow chart of FIG. 18.

The program then proceeds to S302 in which the HC density correction coefficient k.hc is determined or calculated by retrieving table data (whose characteristic is shown in FIG. 19) using the estimated aft-catalyst exhaust gas temperature tmphat.acat as address data.

The program then proceeds to S304 in which the accumulated inflow HC amount hcin.hat (initially set to zero) is determined or calculated using an equation illustrated there. As mentioned above, hcin.hat indicates the total amount of HC flows in the bypass exhaust gas passage 56 and into the adsorbent 74.

The program then proceeds to S306 in which a basic value of the adsorption rate of flowing HC to the adsorbent 74 (named "trap.rate") is determined or calculated. This is done by retrieving mapped data (whose characteristics are shown in FIG. 20) using the measured time since engine starting and the estimated aft-catalyst exhaust gas temperature tmphat.acat as address data.

Figure 20:
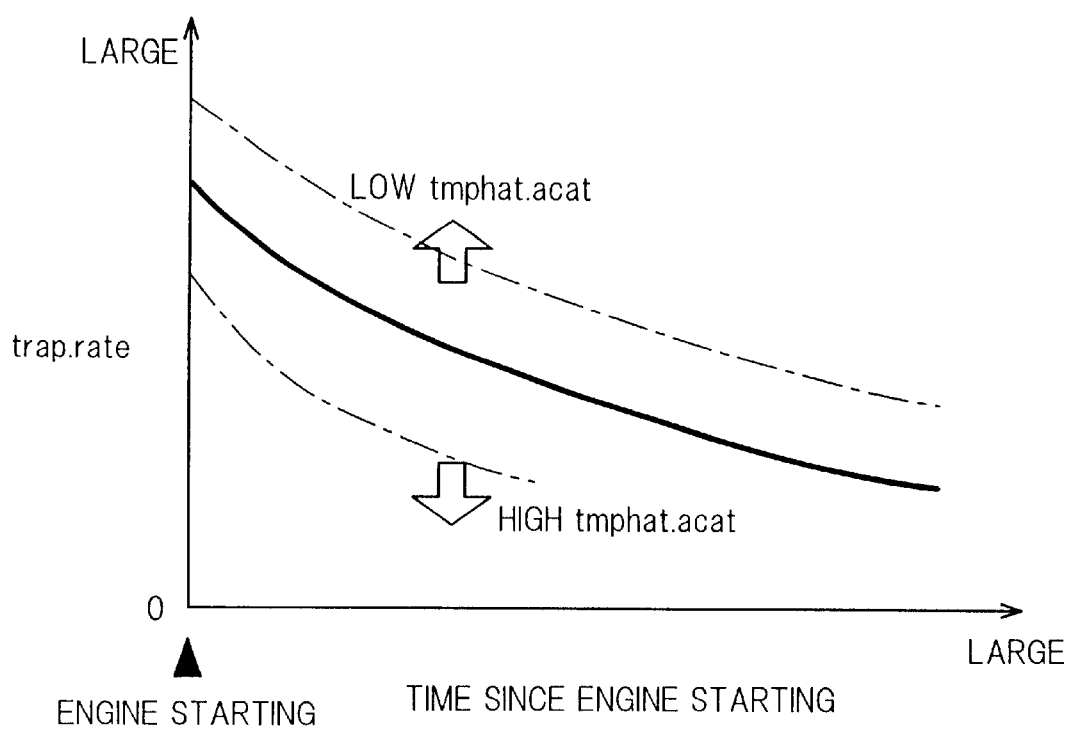
FIG. 20 is a graph showing characteristics of a basic value of the HC adsorption rate referred to in the flow chart of FIG. 18.

Since the value trap.rate also varies with the temperature of the adsorbent 74, the value trap.rate is retrieved using a characteristic shown by a solid line in FIG. 20 when the estimated value tmphat.acat is within a range. If not, it is retrieved using an upper characteristic or a lower characteristic shown by phantom lines depending on the direction in which the estimated value tmphat.acat is out of the range.

It is alternatively possible to measure the exhaust gas temperature downstream of the catalysts 40, 42 using a temperature sensor and instead of the estimated value tmphat.acat, use the measured value, or to use the engine coolant temperature TW, the intake air temperature TA, etc.

Figure 21:
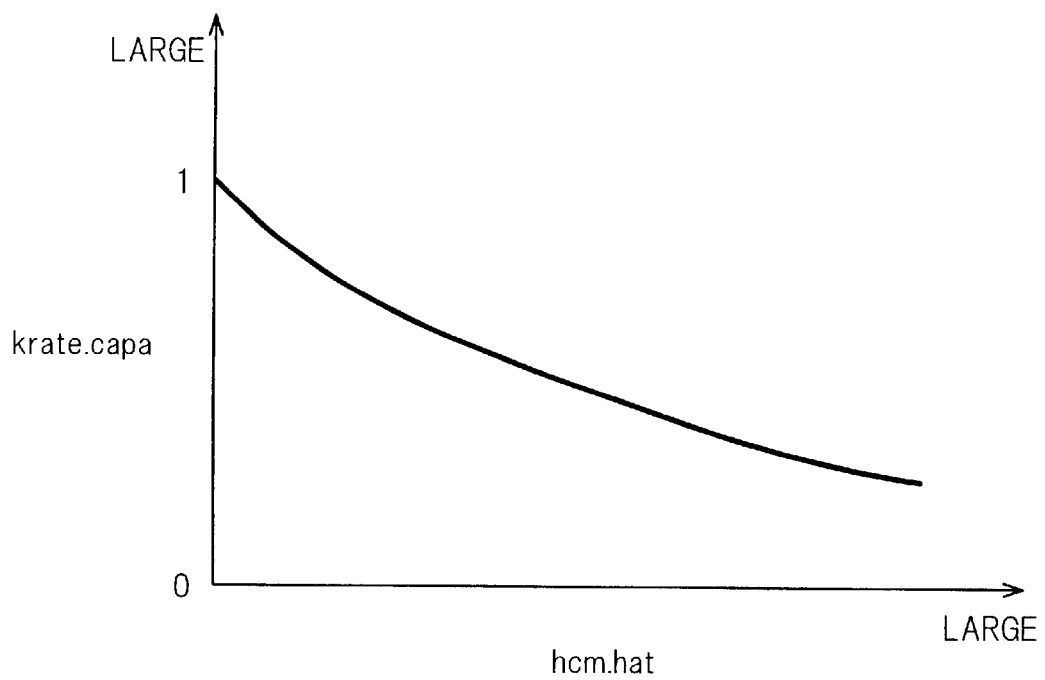
FIG. 21 is a graph showing characteristics of a correction coefficient of the basic value referred to in the flow chart of FIG. 18.

The program then proceeds to S308 in which a correction coefficient (named "krate.capa") of the HC adsorption rate is determined or calculated in the range of 0 to 1. This is done by retrieving table data (whose characteristic is shown in FIG. 21) using the estimated adsorbed HC amount hcm.hat as address data. Since the HC adsorption rate decreases with increasing adsorbed amount (in other words, it decreases with decreasing adsorption capacity), the coefficient krate.capa should be determined to correct the HC adsorption rate.

The program then proceeds to S310 in which the adsorption rate basic value trap.rate is multiplied by the correction coefficient krate.capa to be corrected, and to S312 in which the estimated adsorbed Hc amount hcm.hat is determined or calculated as illustrated. The determined value hcm.hat is stored in a backup portion of the RAM 124 and is kept there after the engine 10 has been stopped.

Returning to the explanation of FIG. 9, the program proceeds to S28 in which the value of the post-engine-starting timer tm.trs is discriminated by a prescribed amount X.TM.TRSJUD. In other words, the measurement of time laps after engine starting is started.

The program then proceeds to S30 in which it is determined whether the value of the timer tm.trs has reached zero. The result is normally negative in the first program loop and the program proceeds to S32 in which it is determined whether the estimate adsorbed HC amount hcm.hat is greater or equal to the maximum adsorption capacity trs.hcmlmt (calculated in S18), in other words, it is determined whether the adsorbed HC amount has reached the maximum and has saturated.

In the embodiment, the adsorption mode is set to a fixed period of time (X.TM.TRSLMT, e.g. 40 sec.) so as to enable the adsorption surely. However, if the adsorbed HC amount has reached the limit, the adsorption mode is forcibly terminated and the bypass exhaust gas passage 56 is closed.

By determining whether the estimated adsorbed HC amount hcm.hat has reached the maximum adsorption capacity trs.hcmlmt and by closing the passage 56 if the result is affirmative, it becomes possible to prevent the desorbed HC from flowing downstream through the opened passage 56. Moreover, since the maximum adsorption capacity trs.hcmlmt is determined based on the engine coolant temperature TW and the estimated adsorbed HC amount hcm.hat, it becomes possible to accurately determine the actual termination of the adsorption mode.

When the result in S32 is negative, the program proceeds to S22. On the other hand, when the result in S32 is affirmative, the program proceeds to S34 in which the bit of the flag f.hctrs.on (instructions to valve operation) is reset to 0. With this, the switch-over valve 60 is operated in another routine to close the bypass exhaust gas passage 56. This indicates the beginning of the desorption (and purging) mode. The same procedure will be taken if the result in S30 is affirmative.

Therefore, in the next or later program loop, the result in S24 is negative and the program proceeds to S36 in which it is discriminated whether the purging (recirculating) of desorbed HC has been completed.

Figure 22:
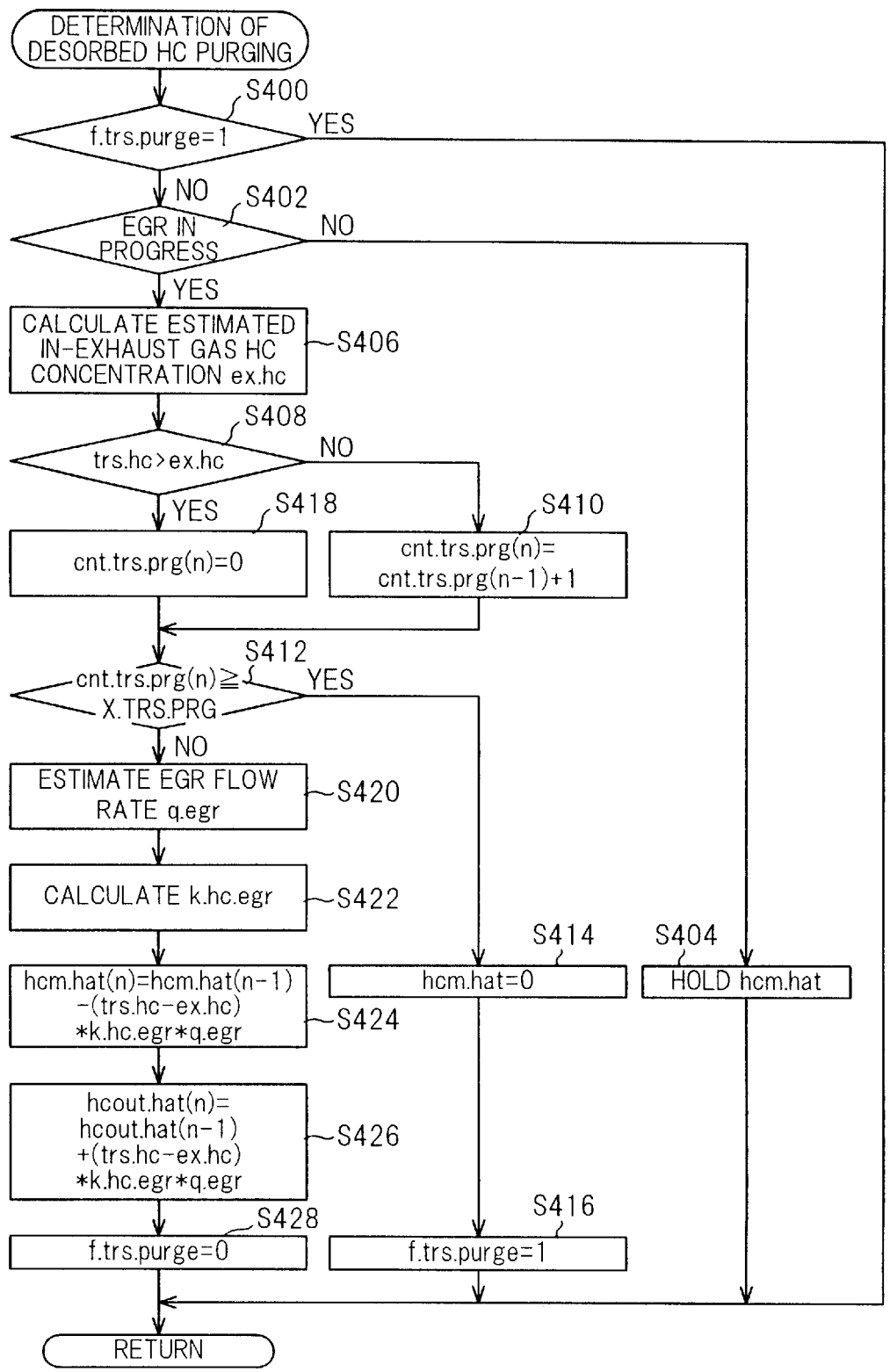
FIG. 22 is a flow chart showing the subroutine for discriminating whether the purging of desorbed HC has been completed referred to in the flow chart of FIG. 9.

FIG. 22 is a flow chart showing the subroutine for this discrimination.

The program begins in S400 in which it is determined whether the bit of a purging-completion-determination flag f.trs.purge is set to 1 and if the result is affirmative, the program is immediately terminated. Since the bit of the flag is set to 1 when the purging (recirculating) of the desorbed HC has been completed, the result is normally negative in the first program loop and proceeds to S402 in which it is determined whether the EGR (Exhaust Gas Recirculation) operation is in progress.

The EGR is determined to be operative or inoperative, in another routine, based on the main engine parameters (defined by the engine speed NE and the engine load (manifold absolute pressure PBA) and the engine warmup condition (determined from the engine coolant temperature TW)), in view of other engine operating conditions (such as whether the engine 10 is under idling or the wide-open-throttle enrichment or the supply of fuel is cut off, etc).

When the result in S402 is negative, since the purging is only conducted when the EGR operation is in progress, the program proceeds to S404 in which the estimated adsorbed HC amount hcm.hat is held or maintained. On the other hand, when the result in S402 is affirmative, since it can be determined that the purging is in progress, the program proceeds to S406 in which the in-exhaust gas HC concentration ex.hc is estimated or determined.

Figure 23:
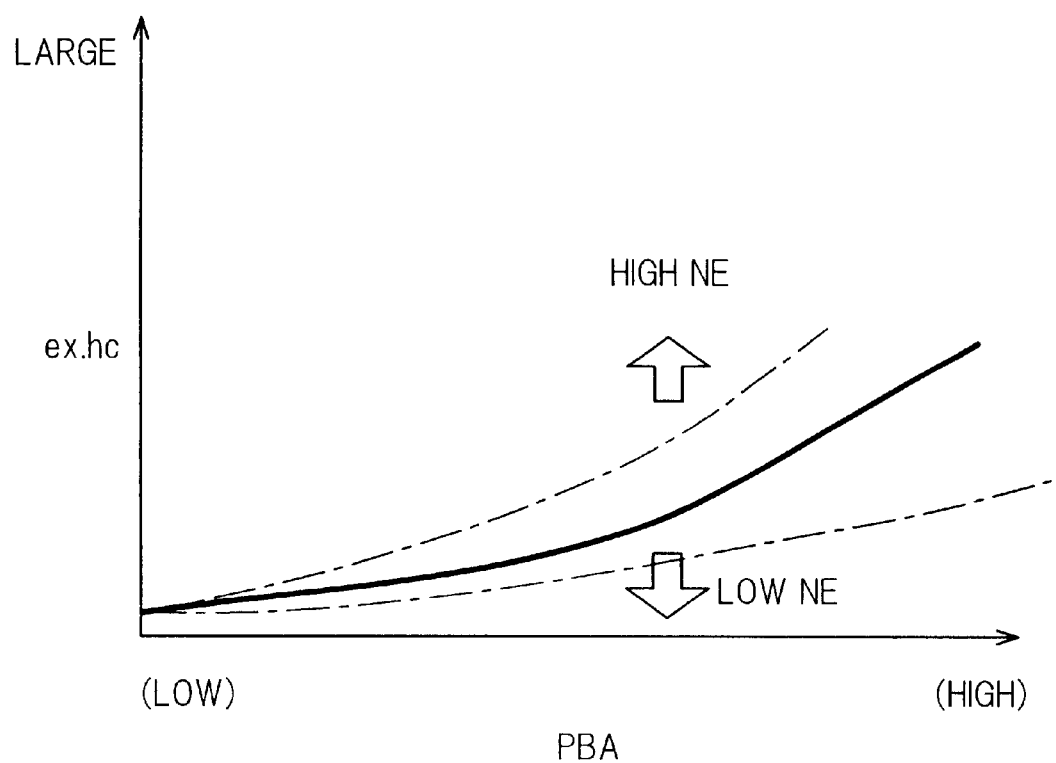
FIG. 23 is a graph showing characteristics of an in-exhaust gas concentration referred to in the flow chart of FIG. 22.

The value ex.hc indicates the HC concentration of the exhaust gas currently generated by the engine 10 in the exhaust gas to be recirculated. In other words, this value ex.hc indicates the HC concentration other than that of the desorbed HC. The value ex.hc is determined by retrieving mapped data (whose characteristics are shown in FIG. 23) using the detected engine load (manifold absolute pressure PBA) and the engine speed NE as address data. Specifically, it is retrieved using a characteristic shown by a solid line in FIG. 23 when the engine speed NE is within a range. If not, it is retrieved using an upper characteristic or a lower characteristic shown by phantom lines depending on the direction in which the engine speed NE is out of the range.

The program then proceeds to S408 in which it is determined whether the detected HC concentration trs.hc is greater than the estimated in-exhaust gas HC concentration ex.hc. When the result is negative, the program proceeds to S410 in which a counter value (named "cnt.trs.prg"), more precisely its last time value cnt.trs.prg(n−1) is incremented to be updated, to S412 in which it is determined whether the current counter value cnt.trs.prg(n) is greater or equal to a threshold value for discriminating purge completion (named "X.TRS.PRG").

When the result in S412 is affirmative, since it can be determined that the purging has been completed (the desorbed HC has been wholly recirculated), the program proceeds to S414 in which the estimated adsorbed HC amount hcm.hat is set to zero. With this, it can prevent estimation errors from being accumulated. The program then proceeds to S416 in which the purge-completion-determination flag f.trs.purge is set to 1.

Explaining this, the fact that the detected HC concentration trs.hc is less than or equal to the HC concentration of exhaust gas newly flowing, would indicate the purging has terminated. In order to make it sure, however, it is, as a precaution, checked whether this condition continues for a predetermined time of period (in program loops, i.e. X.TRS.PRG) and when it does, it is determined that the purging has been completed. With this, it becomes possible to determine the completion of purging.

On the other hand, when the result in S408 is affirmative, since this indicates that the purging has not been completed, the program proceeds to S418 in which the counter value is reset to zero. This will be the same when the counter value is once incremented in S410, but is negative in this step in the next or later program loop.

Figure 24:
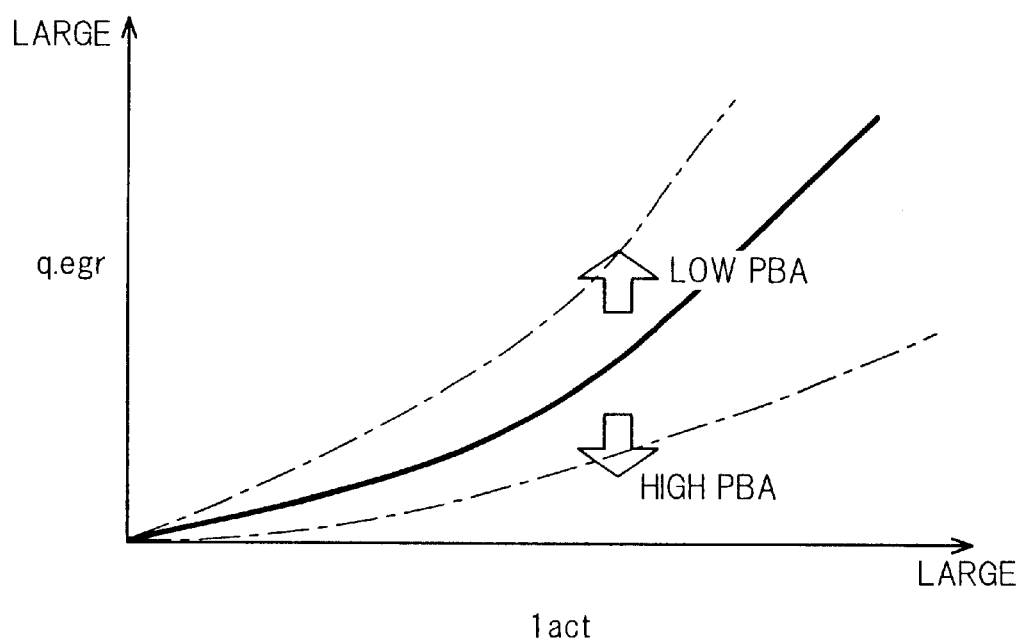
FIG. 24 is a graph showing characteristics of an EGR flow rate referred to in the flow chart of FIG. 22.

When the result in S412 is negative, the program proceeds to S420 in which the EGR flow rate q.egr is estimated or determined. The value q.egr indicates the total amount of recirculated exhaust gas including the desorbed HC. The value ex.hc is determined by retrieving table data (whose characteristics are shown in FIG. 24) using the detected EGR control valve lift amount lact as address data. Specifically, it is retrieved using a characteristic shown by a solid line in FIG. 24.

It is alternatively possible to configure such that the value q.egr is retrieved using the characteristic illustrated by the solid line when the engine load (manifold absolute pressure PBA) is within a range and if not, it is retrieved using an upper characteristic or a lower characteristics shown by phantom lines depending on the direction in which the engine load (manifold absolute pressure PBA) is out of the range. Further, instead of the detected EGR control valve lift amount lact, a command value thereto may be used.

Figure 25:
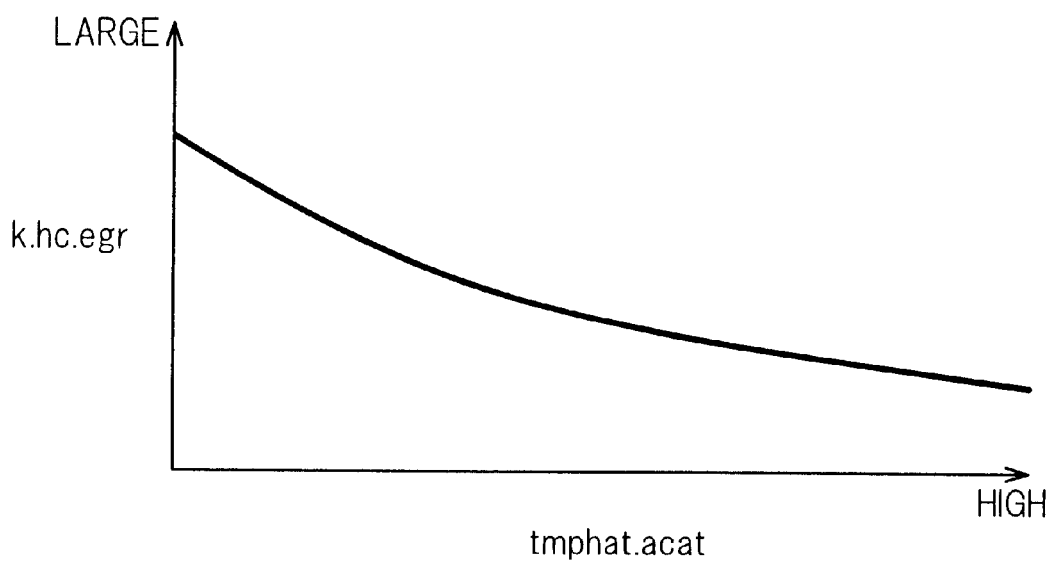
FIG. 25 is a graph showing characteristics of an HC density correction coefficient referred to in the flow chart of FIG. 22.

The program then proceeds to S422 in which the HC density correction coefficient (during EGR) k.hc.egr is determined or calculated. This is done by retrieving table data (whose characteristic is shown in FIG. 25) using the estimated aft-catalyst exhaust gas temperature tmphat.acat as address data.

The program then proceeds to S424 in which the estimated adsorbed HC amount hcm.hat is again determined or corrected using an equation illustrated there. The determined value is similarly stored in the backup portion of the RAM 124.

The program then proceeds to S426 in which the accumulated desorbed HC amount hcout.hat (initially set to zero) is determined or calculated using an equation illustrated there. This value hcout.hat indicates an estimated total amount (mass) of HC flowing out of the adsorbent 74 and the bypass exhaust gas passage 56.

The program then proceeds to S428 in which the bit of the purge-completion-determination flag f.trs.purge is reset to 0.

Again returning to the explanation of FIG. 9 flow chart, the program proceeds to S38 in which it is determined whether the bit of this flag f.trs.purge is set to 1. When the result is negative, the program is immediately terminated, since, unless the purging has been completed, the accumulated desorbed HC amount hcout.hat can not be determined and hence, the HC adsorption ratio agd.pra can not be determined.

On the other hand, when the result in S38 is affirmative, the program proceeds to S40 in which it is discriminated whether the adsorbent 74 has degraded or deteriorated.

Figure 26:
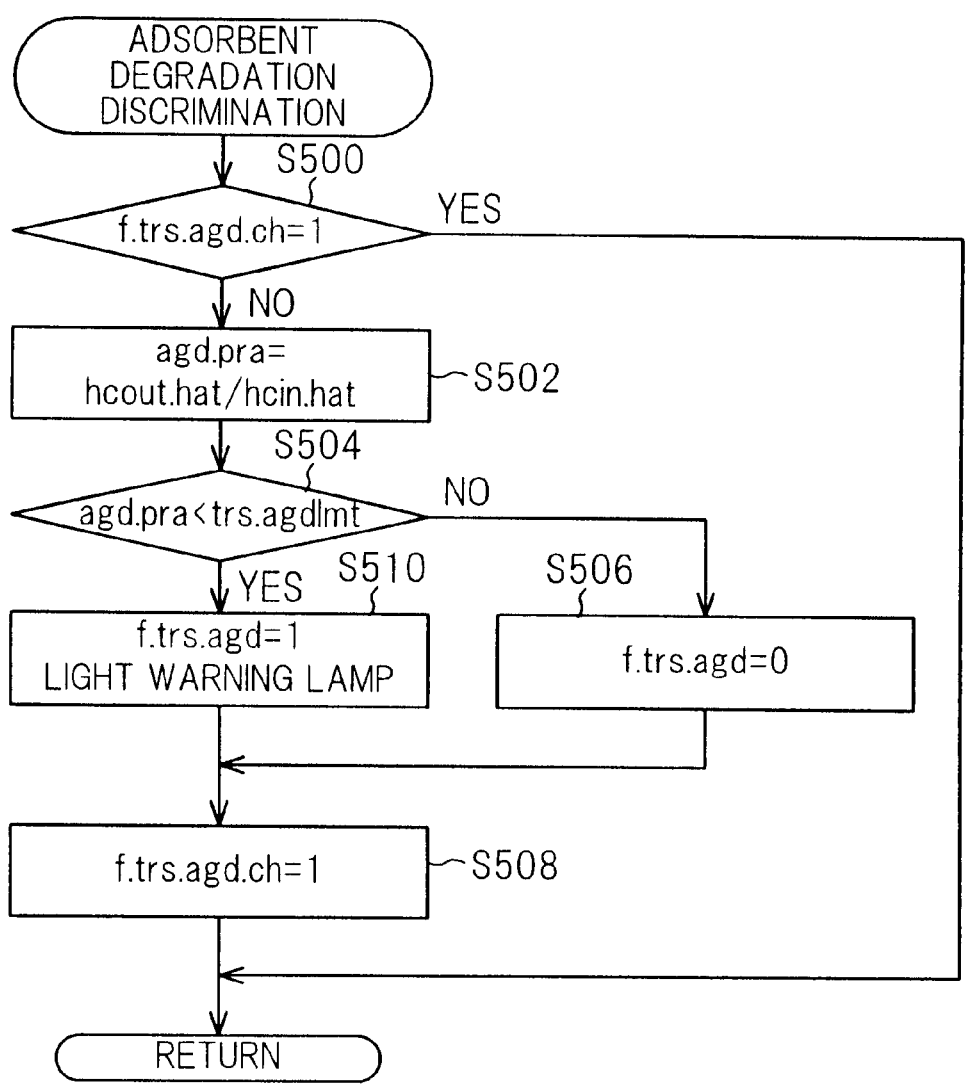
FIG. 26 is a flow chart showing the subroutine for discriminating whether the adsorbent has degraded referred to in the flow chart of FIG. 9.

FIG. 26 is a flow chart showing the subroutine for this discrimination.

The program begins in S500 in which it is determined whether the bit of a discrimination-execution flag (named "ftrs.agd.ch") is set to 1. Since the bit of the flag is initially reset to 0 and is set to 1 when the discrimination is executed, the procedure in this step amounts for determining whether the discrimination was already conducted.

When the result in S500 is affirmative, the program is immediately terminated. When the result is negative, the program proceeds to S502 in which the HC adsorption ratio (rate) agd.pra is calculated by dividing the accumulated outflow HC amount hcout.hat by the accumulated inflow HC amount hcin.hat.

The program then proceeds to S504 in which it is determined whether the calculated ratio agd.pra is less than the threshold value trs.agdlmt, in other words, it is determined whether a desired adsorption ratio is not achieved.

When the result in S504 is negative, since it can be determined that the adsorbent 74 has not degraded or deteriorated, the program proceeds to S506 in which the bit of a degradation discrimination flag f.trs.agd is reset to 0. The program then proceeds to S508 in which the bit of the flag f.trs.agd.ch is set to 1. With this, the result in S500 is affirmative in the next or later program loop, the program is immediately terminated. Thus, since the adsorbent degradation discrimination has once been conducted, the discrimination is no longer repeated in that vehicle trip. The bit of this flag f.tra.agd.ch will be reset to zero if the engine 10 is again started such that the adsorbent degradation discrimination will be conducted once in the next vehicle trip.

On the other hand, when the result in S504 is affirmative, since it can be determined that the adsorbent 74 has degraded or deteriorated, the program proceeds to S510 in which the bit of the flag f.trs.agd is set to 1 and the warning lamp 144 lit to inform the result to the operator. Once the bit of the flag f.trs.agd is set to 1, it will not be reset to 0 at next engine starting and kept to be set to 1.

Since the degradation discrimination system for an internal combustion engine exhaust gas purification system according to this embodiment is configured to monitor the behavior of the HC through the HC sensor 104 and to determine the accumulated inflow HC amount hcin.hat in the adsorption mode and the accumulated outflow HC amount hcout.hat in the desorption (and purging) mode such that the ratio agd.pra therebetween should be compared with the threshold value trs.agdlmt to discriminate whether the adsorbent 74 has degraded or deteriorated, the system can discriminate the occurrence of adsorbent degradation with accuracy.

Further, since the system is configured to use the exhaust gas volume trs.sv flowing into the adsorbent 74 in determining the accumulated inflow HC amount hcin.hat, the system can thus monitor the behavior not through the HC concentration, but through the HC amount (mass), thereby improving the discrimination accuracy. The system makes it possible to determine the exhaust gas volume trs.sv in a simple manner with the use of the detected engine operating conditions defined by the engine speed NE and the load (manifold absolute pressure PBA).

Furthermore, since the system is configured to use the EGR flow rate q.egr in determining the accumulated outflow HC amount hcout.hat, the system can also monitor the behavior not through the HC concentration but through the HC amount (mass), thereby also improving the discrimination accuracy. The system makes it possible to determine the EGR flow rate q.egr in a simple manner with the use of the engine load (manifold absolute pressure PBA) and the EGR control valve lift amount.

Furthermore, since the system is configured to use the estimated aft-catalyst exhaust gas temperature tmphat.acat in determining the accumulated inflow HC amount hcin.hat and the accumulated outflow HC amount hcout.hat, the system can determine the HC amount (mass) with high accuracy, thereby improving the discrimination accuracy.

Furthermore, since the system is configured to use the estimated in-exhaust gas HC concentration ex.hc in determining the accumulated outflow HC amount hcout.hat, the system can determine the value hcout.hat accurately, thereby improving the discrimination accuracy.

Furthermore, since the system is configured to discriminate the degradation based on the ratio agd.pra between the accumulated inflow HC amount hcin.hat and the accumulated outflow HC amount hcout.hat, the system can discriminate the change in the adsorbing condition of the adsorbent 74, thereby improving the discrimination accuracy. By determining the threshold value trs.agdlmt from the engine coolant temperature TW and the estimated adsorbed HC amount hcm.hat, the system can determine the threshold value properly, thereby improving the discrimination accuracy.

Figure 27:
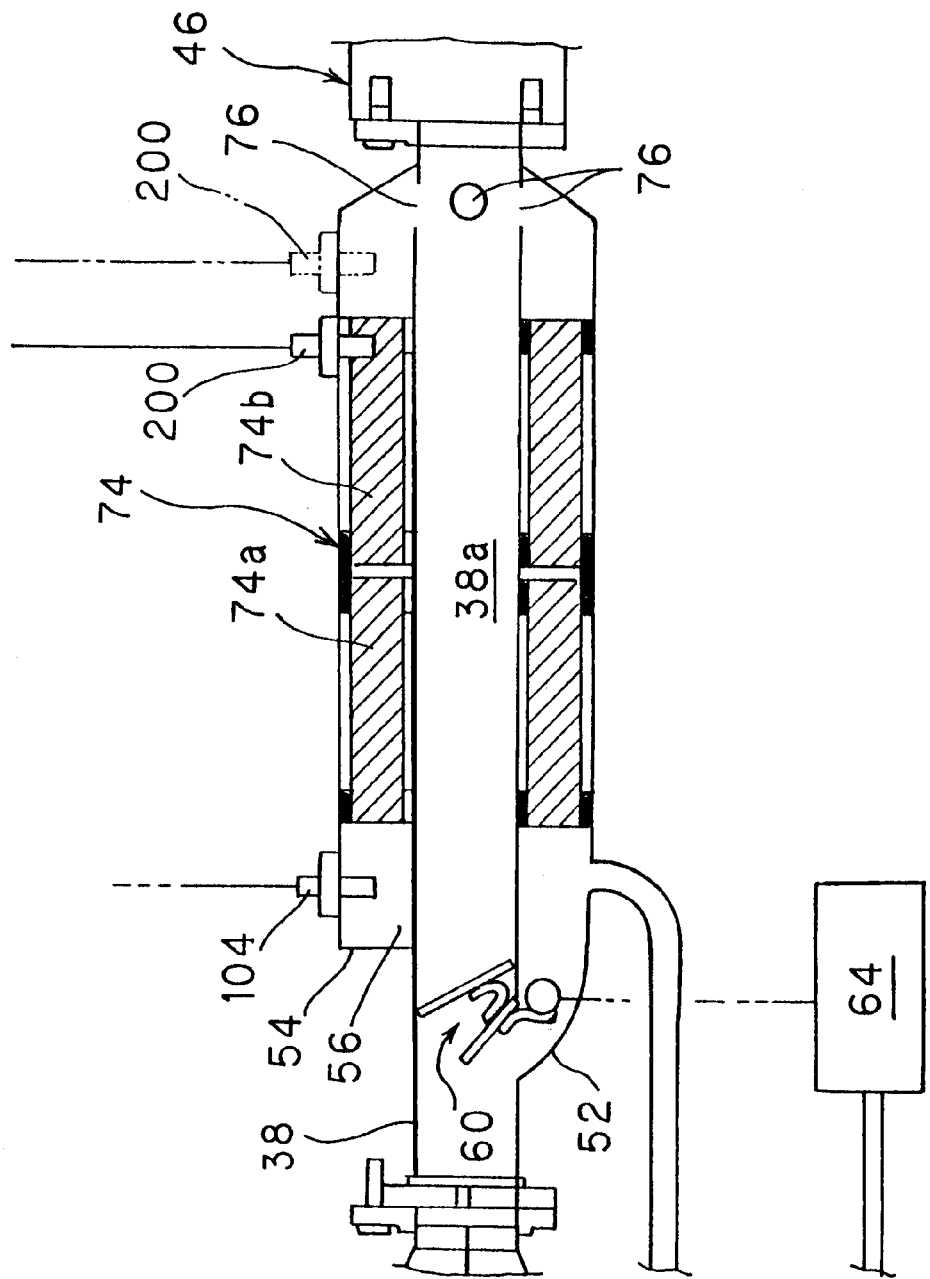
FIG. 27 is a cross sectional view of a chamber showing a partial configuration of a degradation discrimination system of an internal combustion engine exhaust gas purification system according to a second embodiment of the invention.

FIG. 27 is a cross sectional view of the chamber 54 showing a partial configuration of a degradation discrimination system of an internal combustion engine exhaust gas purification system according to a second embodiment of the invention.

In the second embodiment, as illustrated in FIG. 27, in addition to the HC sensor 104, a temperature sensor 200 is installed at the adsorbent 74 in the bypass exhaust gas passage 56, more precisely at a location close to the rear end of the second adsorbent bed 74b. The temperature sensor 200 generates a signal indicative of the temperature of the adsorbent 74.

It is alternatively possible to install the temperature sensor 200 at a position downstream of the second adsorbent bed 74b as shown by phantom lines in the figure such that it generates a signal indicative of the temperature at the exit of the chamber 54 and based on the sensor output, to estimate the temperature of the adsorbent 74.

Figure 28:
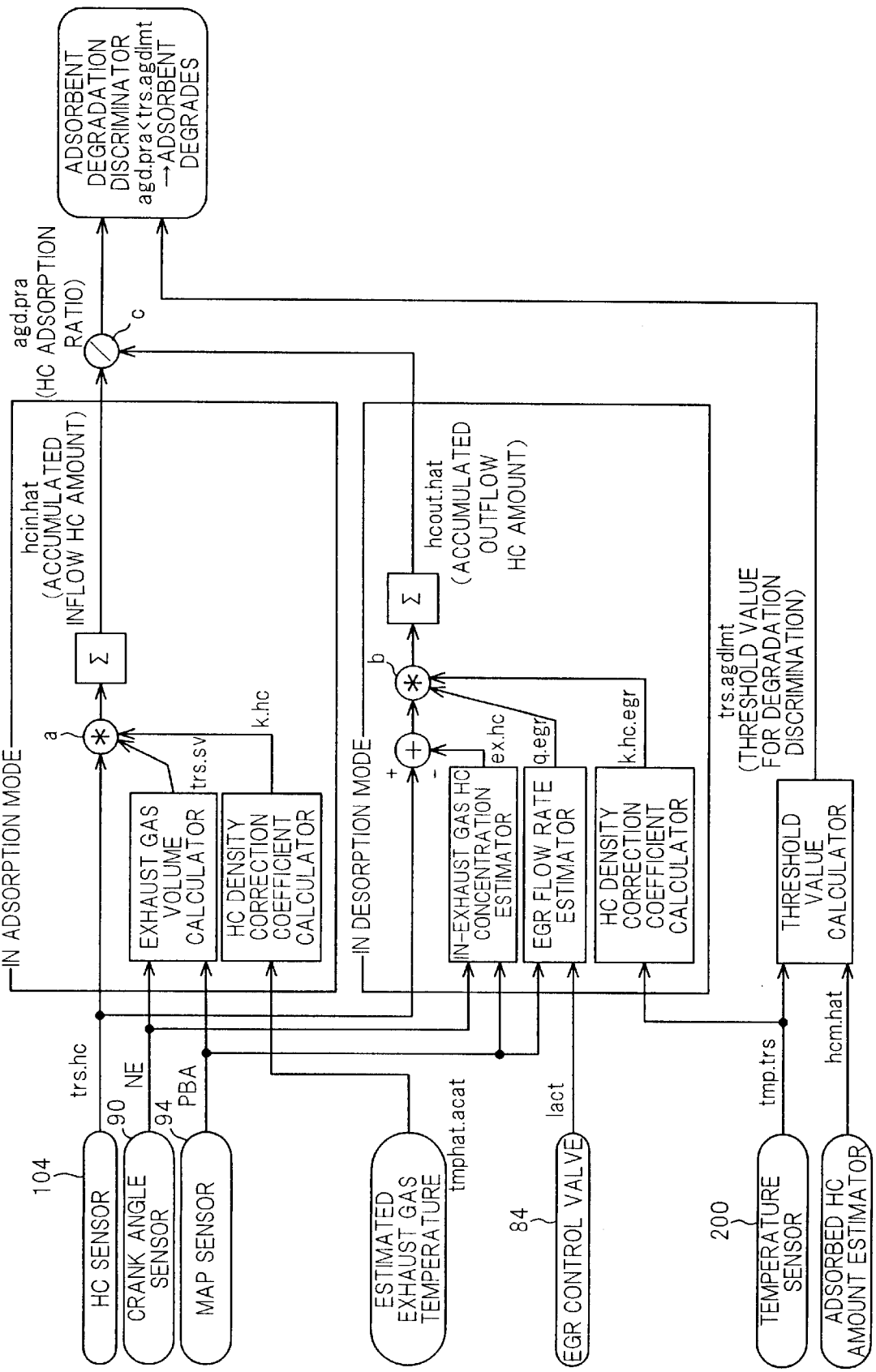
FIG. 28 is a view, similar to FIG. 8, but showing the operation of the degradation discrimination system of an internal combustion engine exhaust gas purification system according to the second embodiment illustrated in FIG. 27.
Figure 29:
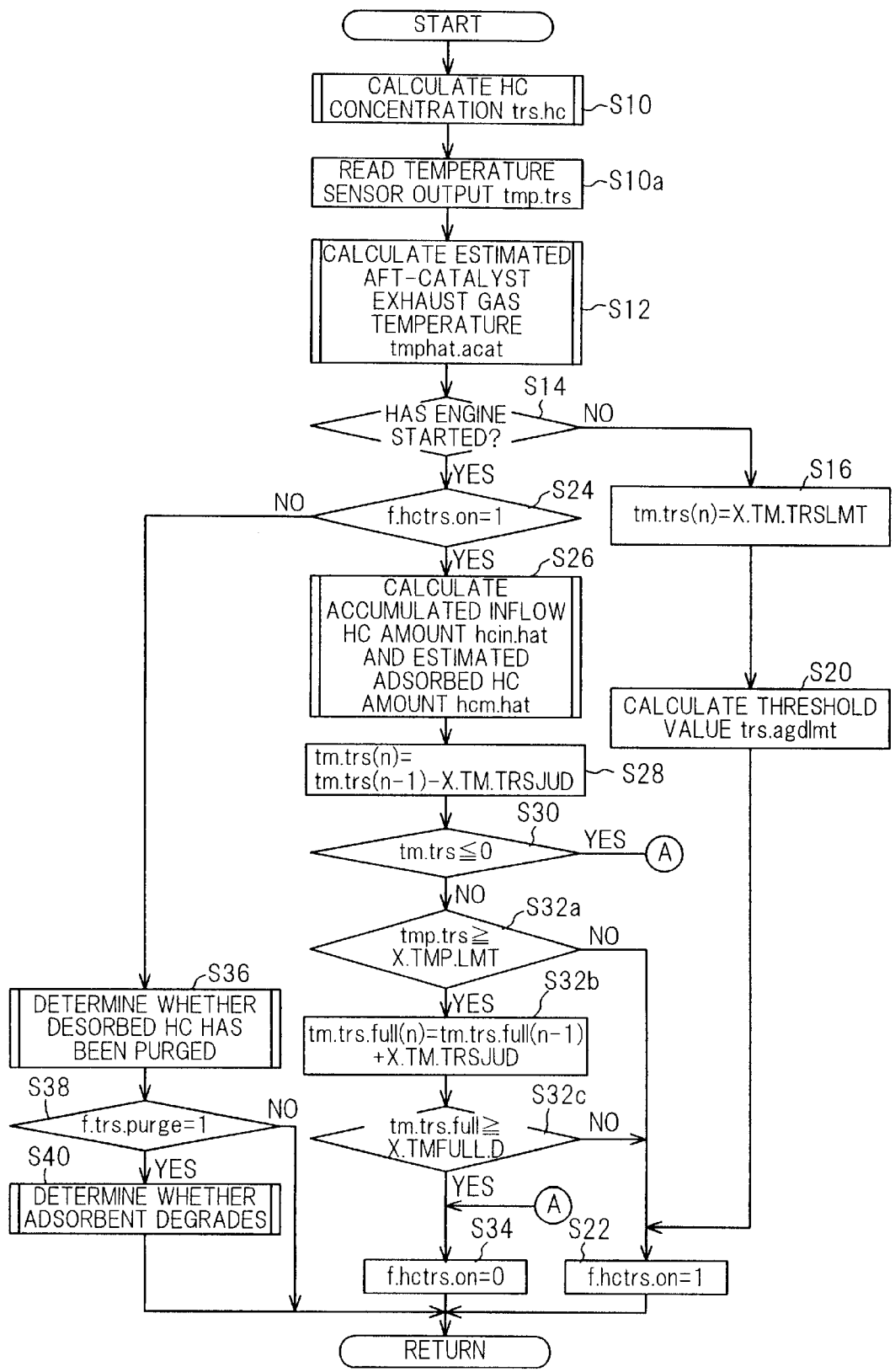
FIG. 29 is a view, similar to FIG. 9, but showing the operation of the system illustrated in FIG. 27.

FIGS. 28 and 29 are views, similar to FIGS. 8 and 9, but showing the operation of the system according to the second embodiment.

Explaining this with focus on the differences from the first embodiment, as disclosed in FIG. 28, the second embodiment is configured to calculate threshold value trs.agdlmt and the HC density correction coefficient (during EGR) k.hc.egr, using, instead of the engine speed NE, the adsorbent temperature (called "temp.trs") detected by the temperature sensor 200, thereby enhancing the accuracy of calculation accuracy and the adsorbent degradation discrimination.

The operation will be explained with reference to the flow chart of FIG. 29. For ease of understanding, the same step as that in the first embodiment is assigned with the same number.

The program begins in S10 in which the detected HC concentration trs.hc is read similar to the first embodiment and proceeds to S10a in which the detected adsorbent temperature tmp.trs obtained by the temperature sensor 200 is read. When the temperature sensor 200 is inactive, the temperature is to be set to a predetermined value such as the detected engine coolant temperature TW or the intake air temperature TA.

The program proceeds to S12 in which the aft-catalyst exhaust gas temperature tmphat.acat is estimated or determined in the same as the first embodiment, and to S14 in which it is determined whether the engine 10 has been started. When the result is negative, the program proceeds to S16 in which the timer value tm.trs(n) is set with the predetermined value X.TM.TRSLMT.

In the second embodiment, S18 in the flow chart of FIG. 9 in the first embodiment for determining the maximum adsorption capacity trs.hcmlmt is removed, since, the adsorbent temperature tmp.trs is instead used to determine the termination of the adsorption mode, as will be explained.

Figure 30:
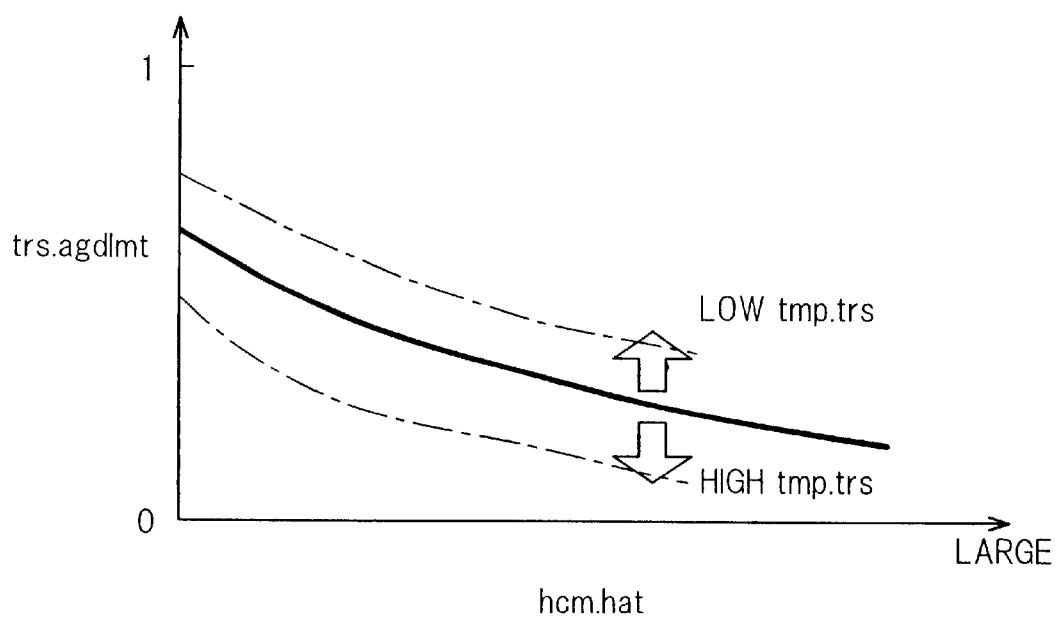
FIG. 30 is a graph showing characteristics of a threshold value (for degradation discrimination) referred to in the flow chart of FIG. 29.

The program proceeds to S20 in which the threshold value trs.agdlmt is determined. Since the adsorbent temperature tmp.trs is used in the second embodiment, the threshold value trs.agdlmt is determined by retrieving it from mapped data (whose characteristics are shown in FIG. 30) using the adsorbent temperature tmp.trs and the estimated adsorbed HC amount hcm.hat as address data. The second embodiment can improve the threshold value determination accuracy by using the value tmp.trs which directly indicates the temperature of the adsorbent 74.

The program is once terminated via S22.

In the next or later program loop, when the result in S14 is affirmative, the program proceeds to S24 in which it is determined whether the bit of flag is set to 1 and if the result is affirmative, the program proceeds to S26 in which the accumulated inflow HC amount hcin.hat and the adsorbed HC amount hcm.hat are determined or estimated.

Figure 31:
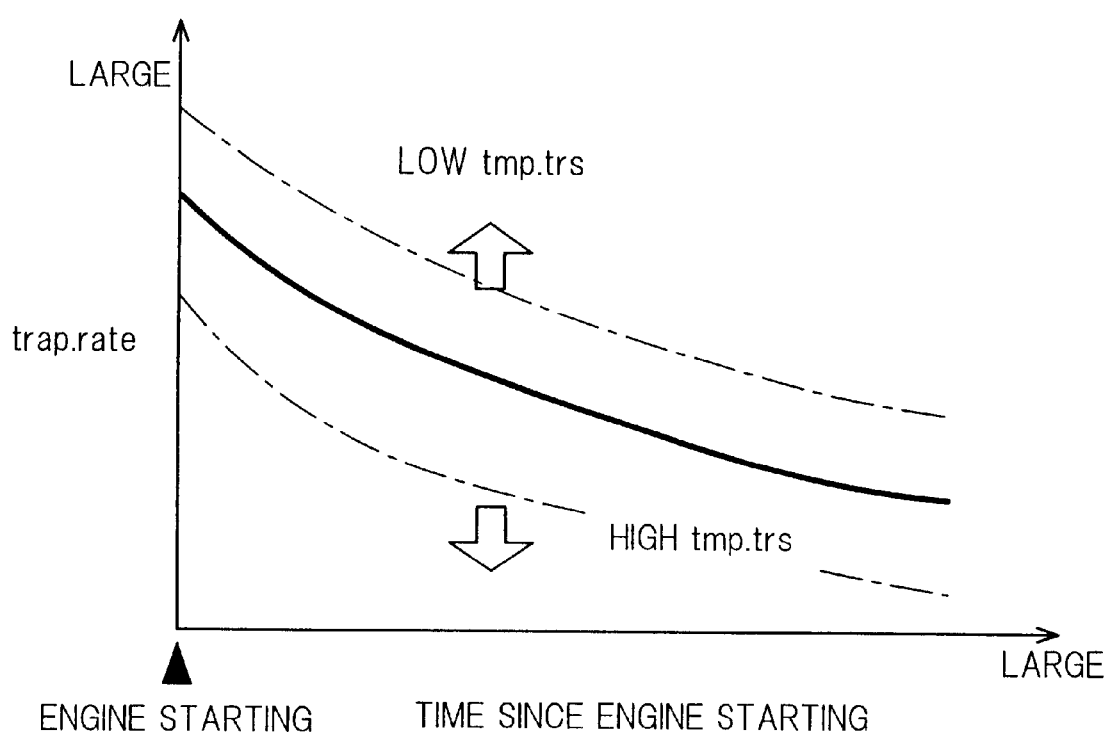
FIG. 31 is a graph showing characteristics of a basic value of the HC adsorption rate referred to in the flow chart of FIG. 29.

The determination is the same as that in the first embodiment except that determination of the HC adsorption basic value trap.rate (in a step similar to S306 in the flow chart of FIG. 18) is made not based on the characteristics shown in FIG. 20, but based on characteristics shown in FIG. 31. More specifically, instead of the estimated aft-catalyst exhaust gas temperature tmphat.acta, the adsorbent temperature tmp.trs is used.

The program then proceeds to S28 in which the timer value tm.trs is decremented by the prescribed value X.TM.TRSJUD, to S30 in which it is determined whether the timer value has reached zero. When the result is affirmative, the program proceeds to S34.

When the result is negative, the program proceeds to S32a in which, instead of the determination whether the adsorbent amount is saturated, it is determined whether the adsorbent temperature tmp.trs is greater or equal to an appropriately set threshold value X.TMP.LMT (e.g. 50° C.) to discriminate whether the adsorption mode has actually finished.

To be more specific, since the adsorbent temperature tmp.trs is maintained at a temperature (the dew point, e.g. 50° C.) in the adsorption mode due to the influence of the heat of vaporization of moisture adsorbed together with HC, it is possible to conduct the discrimination of the completion of the adsorption mode by this. HC having a larger carbon number will need ta emperature rise from 100° C. to 250° C. to be desorbed.

Thus, since it can be determined from the fact (that the adsorbent temperature rises to the threshold value) that the desorption has begun, the bypass exhaust gas passage 56 is closed, even if the predetermined period of time X. TM.TRSLMT has not expired. With this, the system can prevent the desorbed HC from being emitted downstream.

When the result in S32a is affirmative, the program proceeds to S32b in which a desorption-beginning-determination timer (named tm.trs.full(n)) is incremented by a prescribed amount X.TM.TRSJUD, to S32c in which it is determined whether the value of timer tm.trs.full is greater or equal to a threshold value X.TMFULL.D. When the result is affirmative, the program proceeds to S34 in which the bit of the flag f.hctrs.on is reset to 0.

Thus, in the second embodiment, a delay time of X.TM-FULL.D is provided. With this, the system according to the second embodiment can determine the termination of the adsorption mode more accurately.

It should be noted that the temperature sensor 200 may be located at a location in the upstream direction (in the term of exhaust gas flow) of the adsorbent 74 towards the chamber entrance as will be explained in a later embodiment. However, if it does, since the sensor will only generate an output indicative of the temperature of a portion of the adsorbent 74 which decreases as the sensor location is closer to the chamber entrance, the delay time should accordingly be extended.

Figure 32:
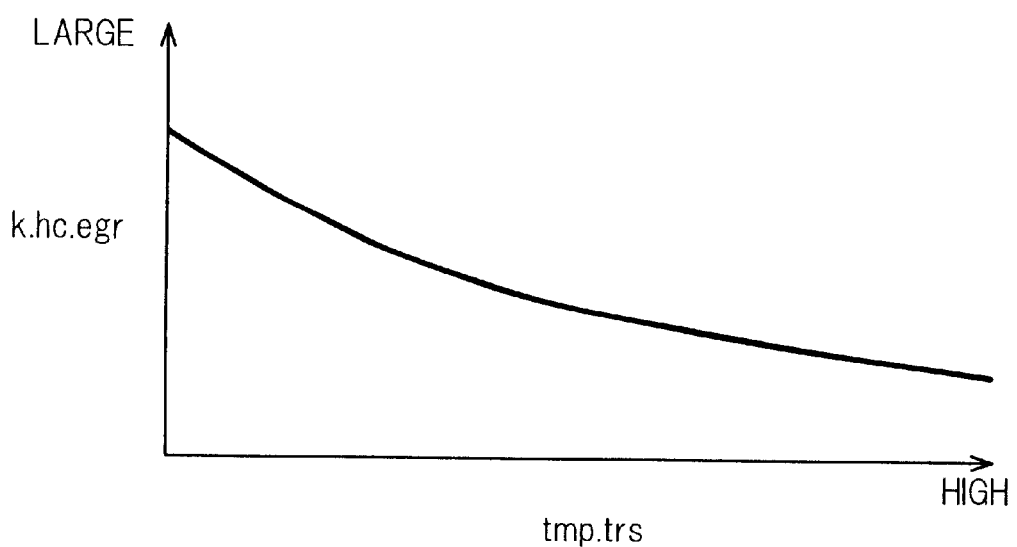
FIG. 32 is a graph showing characteristics of an HC density correction coefficient referred to in the flow chart of FIG. 29.

In the flow chart of FIG. 29, when the result in S24 is negative, the program proceeds to S36 in which it is determined whether the desorbed HC has been purged in the same manner as in the first embodiment, except that the HC density correction coefficient (during EGR) k.hc.egr is determined (in a step similar to S422 in the flow chart of FIG. 22) not using the characteristic shown in FIG. 25, but using that shown in FIG. 32. In other words, the coefficient k.hc.egr is determined not based on the estimated aft-catalyst exhaust gas temperature tmphat.acat, but is based on the adsorbent temperature tmp.trs.

In the flow chart of FIG. 29, when the result in S38 is affirmative, the program proceeds to S40 in which it is discriminated whether the adsorbent 74 has degraded or deteriorated in the same manner as the first embodiment.

Since the degradation discrimination system for an internal combustion engine exhaust gas purification system according to the second embodiment is configured to monitor the behavior of the HC through the HC sensor 104 and to determine the accumulated inflow HC amount hcin.hat in the adsorption mode and the accumulated outflow HC amount hcout.hat in the desorption (and purging) mode such that the ratio agd.pra therebetween should be compared with the threshold value trs.agdlmt to discriminate whether the adsorbent 74 has degraded or deteriorated, the system can discriminate the occurrence of adsorbent degradation with accuracy.

Further, in addition to the same advantages and effects as the first embodiment, since the system according to the second embodiment is configured to use the value tmp.trs directly indicative of the temperature of the adsorbent 74, the system can have advantages and effects to further improve the calculation accuracy of the HC density correction coefficient (during EGR) k.hc.egr and the threshold value trs.agdlmt, thereby enabling to further enhance the degradation discrimination accuracy of the adsorbent 74.

Figure 33:
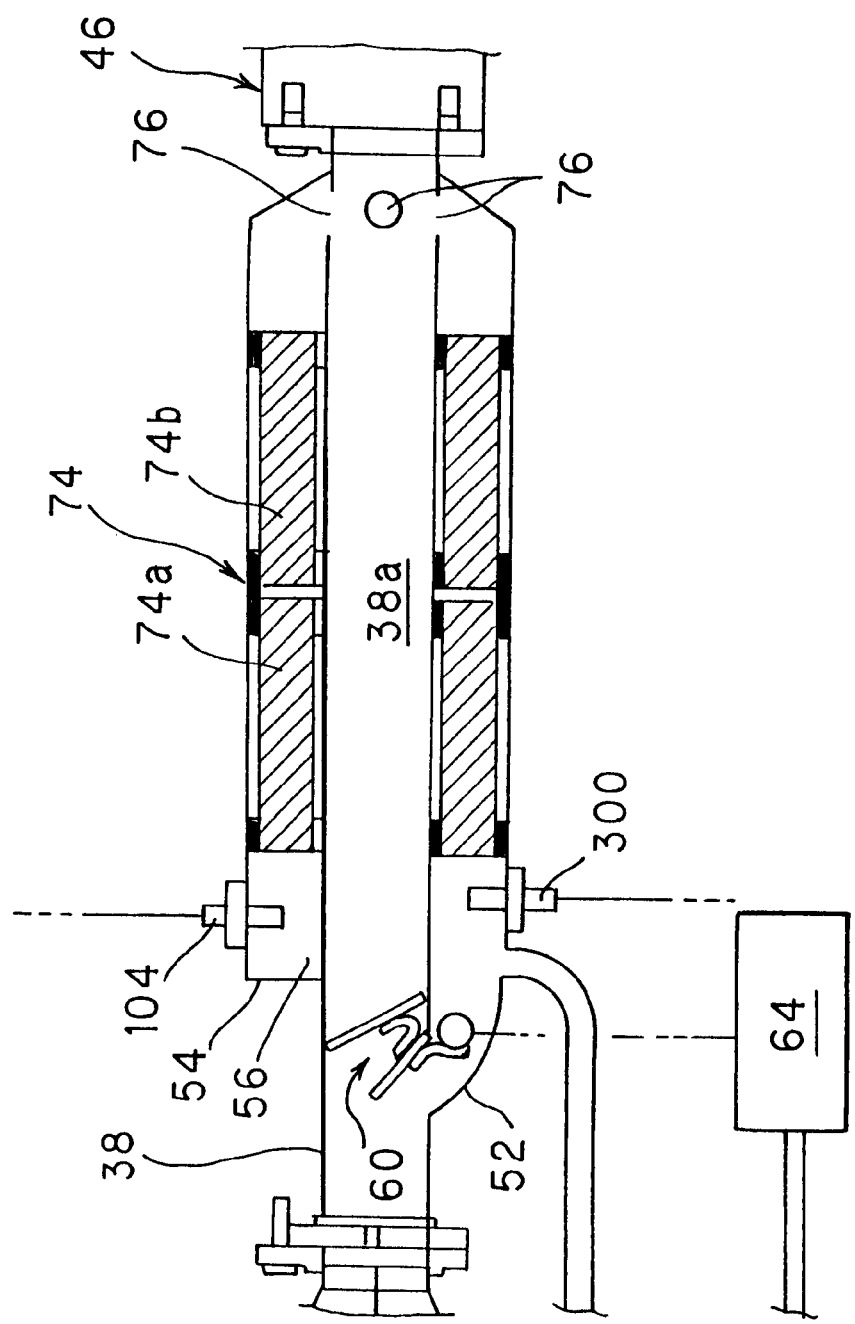
FIG. 33 is a cross sectional view of a chamber showing a partial configuration of a degradation discrimination system of an internal combustion engine exhaust gas purification system according to a third embodiment of the invention.

FIG. 33 is a cross sectional view of the chamber 54 showing a partial configuration of a degradation discrimination system of an internal combustion engine exhaust gas purification system according to a third embodiment of the invention.

In the third embodiment, as illustrated in the figure, in addition to the HC sensor 104, a temperature sensor 300 is installed in the chamber 54 at a location upstream of the adsorbent 74, more precisely at a location close to the upper end of the first adsorbent bed 74a. The temperature sensor 300 generates a signal indicative of the temperature at the entrance of the bypass exhaust gas passage 56.

Figure 34:
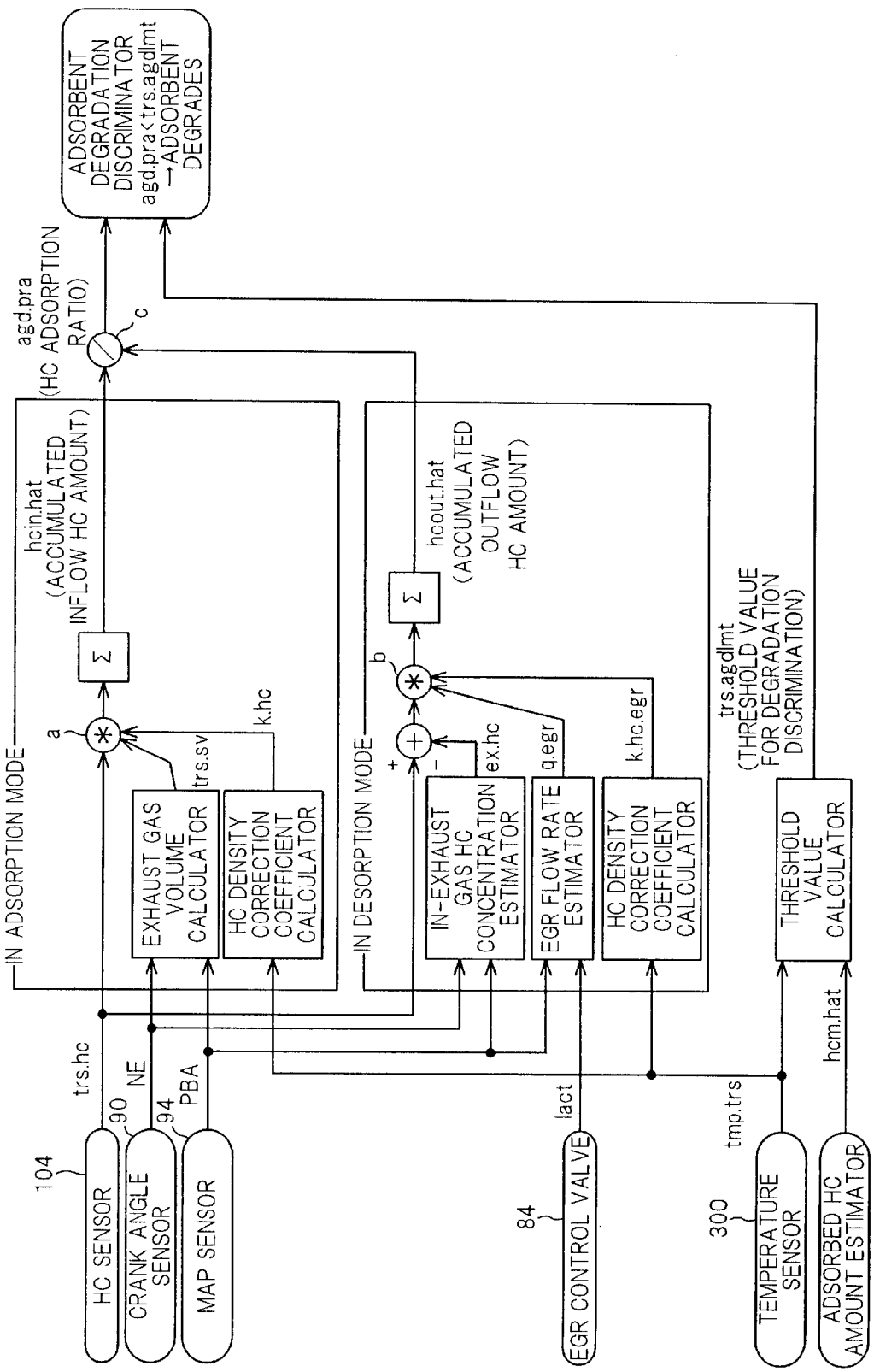
FIG. 34 is a view, similar to FIG. 8, but showing the operation of the degradation discrimination system of an internal combustion engine exhaust gas purification system according to the third embodiment illustrated in FIG. 33.
Figure 35:
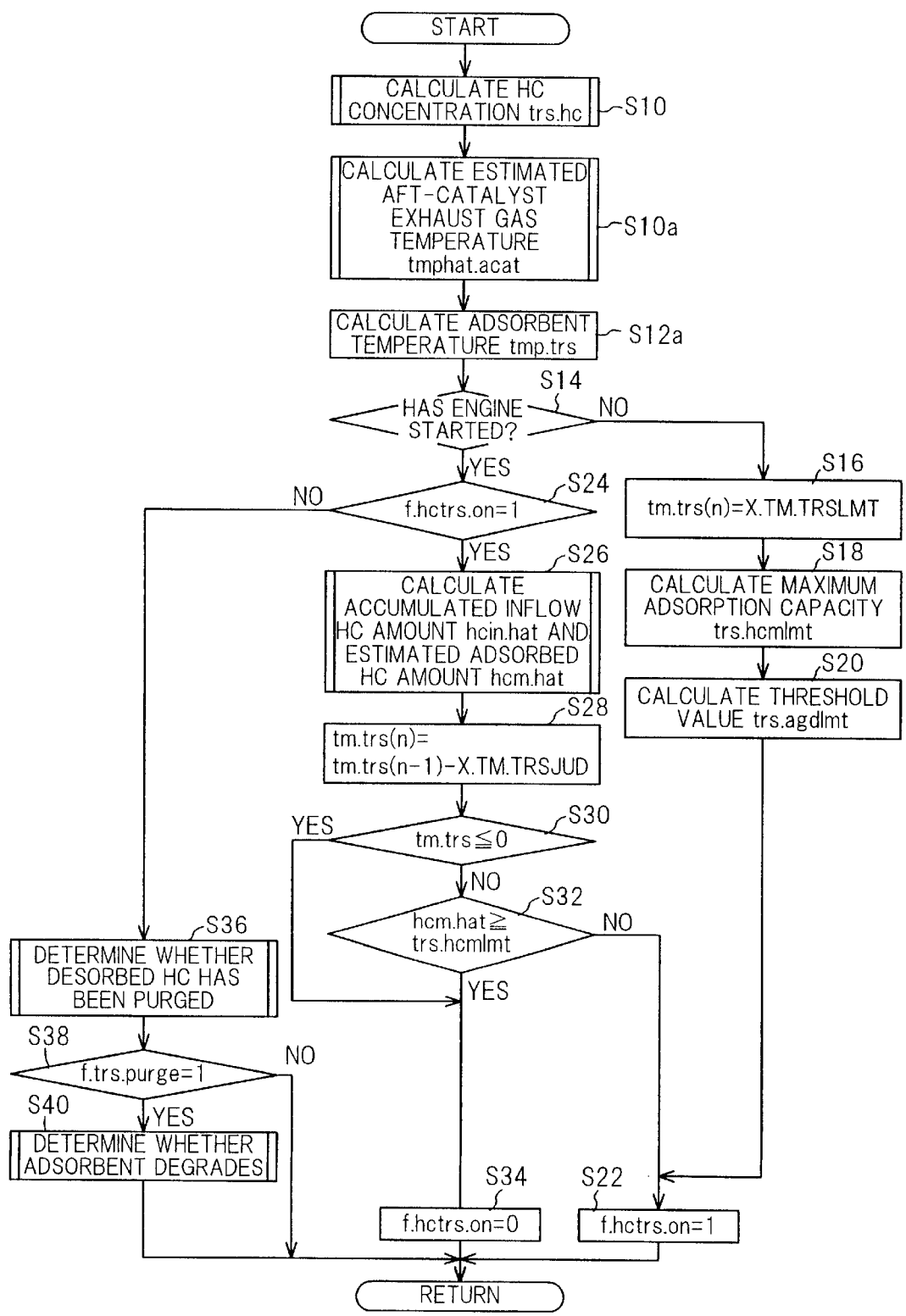
FIG. 35 is a view, similar to FIG. 9, but showing the operation of the system illustrated in FIG. 33.

FIGS. 34 and 35 are views, similar to FIGS. 8 and 9, but showing the operation of the system according to the third embodiment.

Explaining this with focus on the differences from the first embodiment, as disclosed in FIG. 34, the third embodiment is configured to calculate threshold value trs.agdlmt, the HC density correction coefficient (during EGR) k.hc.egr and the similar HC density correction coefficient k.hc, using, instead of the engine speed NE, the temperature (called "temp.trs") detected by the temperature sensor 300. Since the temperature sensor 300 is located upstream of the adsorbent 74, the system can estimate not only the adsorbent temperature at HC flowing out, but also that at HC flowing in, and can also calculate the HC density correction coefficient k.hc from the temperature, thereby enhancing the calculation accuracy of the value.

The operation will be explained with reference to the flow chart of FIG. 35. For ease of understanding, the same step as that in the first embodiment is assigned with the same number.

The program begins in S10 in which the detected HC concentration trs.hc is read similar to the first embodiment and proceeds to S12 in which the aft-catalyst temperature tmphat.acat is estimated or determined. Then, the program proceeds to S12a in which the adsorbent temperature tmp.trs is determined or calculated.

Figure 36:
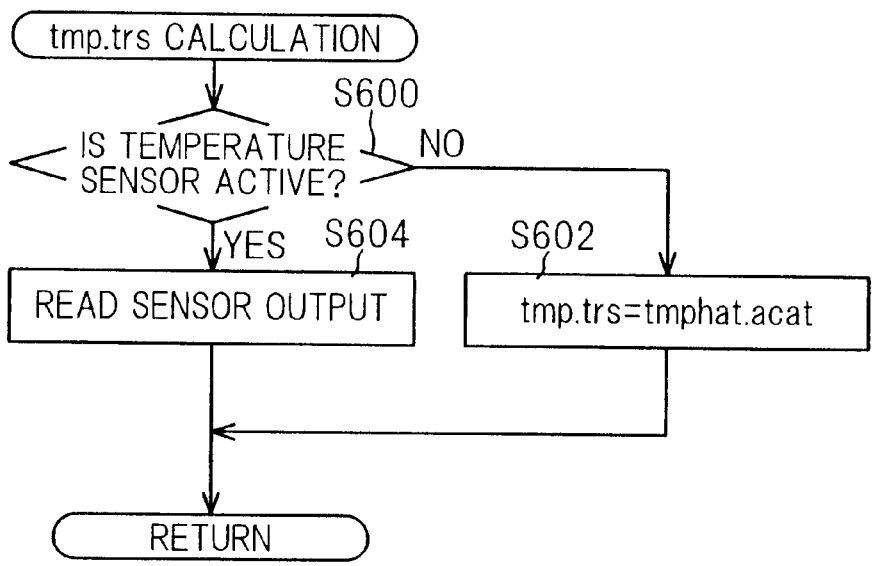
FIG. 36 is a flow chart showing the subroutine of determining an adsorbent temperature referred to in the flow chart of FIG. 35.

FIG. 36 is a flow chart showing the subroutine of this.

The program begins in S600 in which it is determined whether the temperature sensor 300 is active and when the result is negative, proceeds to S602 in which the adsorbent temperature tmp.trs is set to the same as the estimated aft-catalyst exhaust gas temperature tmphat.acat. On the other hand, when the result is affirmative, the program proceeds to S604 in which the output of the temperature sensor 300 is immediately read.

In the second embodiment mentioned above, the procedures are conducted in the order of calculation of HC concentration trs.hc, reading of the temperature sensor output and estimation of the aft-catalyst exhaust gas temperature tmphat.acat. In the third embodiment, they are conducted in the order of calculation of HC concentration trs.hc, estimation of the aft-catalyst exhaust gas temperature tmphat.acat and reading of the temperature sensor output.

The reason is that, since the temperature sensor 200 is located at the position in the downstream side of the adsorbent 74 in the second embodiment, when the temperature sensor is inactive, other temperatures such as the engine coolant temperature TW can be used as the adsorbent temperature. Like the first embodiment, no temperature sensor is provided at the downstream side of the adsorbent 74 in the third embodiment. Moreover, since the procedure in S12a needs the estimated aft-catalyst exhaust gas temperature tmphat.acat, the third embodiment is configured to first estimate the temperature tmphat.acat and then determine the adsorbent temperature tmp.trs.

Figure 37:
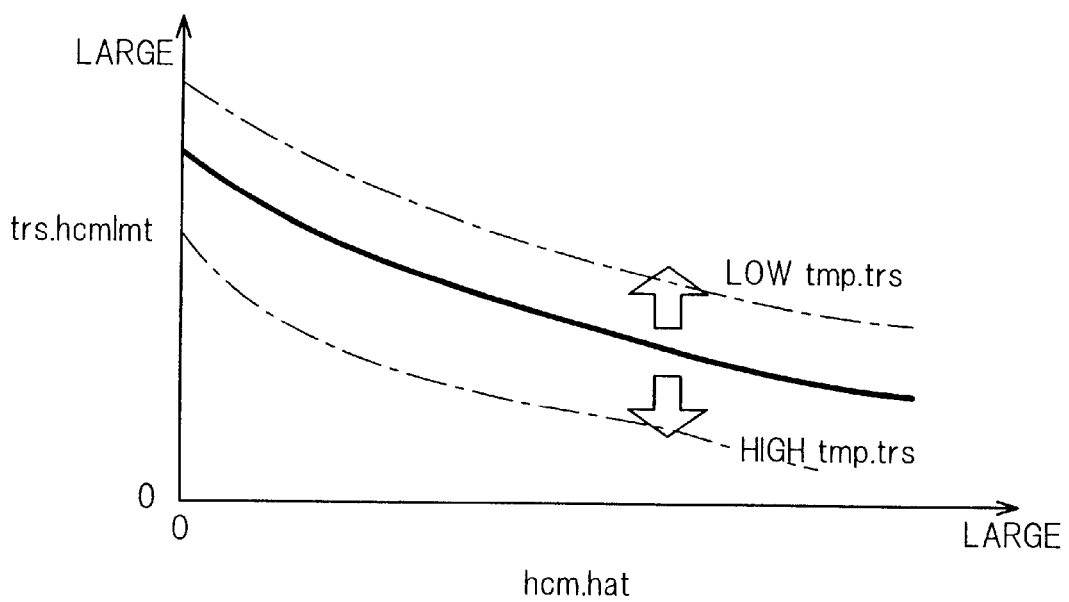
FIG. 37 is a graph showing characteristics of a maximum adsorption capacity referred to in the flow chart of FIG. 35.

In the flow chart of FIG. 35, the program then proceeds to S14 in which it is determined whether the engine 10 has been started. When the result is negative, the program proceeds to S16 in which the timer value tm.trs(n) is set with the predetermined value X.TM.TRSLMT. The program then proceeds to S18 in which the maximum adsorption capacity trs.hcmlmt is determined by retrieving mapped data (whose characteristics are shown in FIG. 37) using, instead of the engine coolant temperature TW, the adsorbent temperature tmp.trs as address data.

The program proceeds to S20 in which the threshold value trs.agdlmt is determined. Since the adsorbent temperature tmp.trs is used in the third embodiment, the threshold value trs.agdlmt is retrieved from mapped data (whose characteristics are similar to those shown in FIG. 30) using the adsorbent temperature tmp.trs (instead of the engine coolant temperature TW) and the estimated HC adsorbed amount hcm.hat as address data in the same manner as the second embodiment.

Then the program is once terminated via S22.

In the next or later program loop, when the result in S14 is affirmative, the program proceeds to S24 in which it is determined whether the bit of flag is set to 1 and if the result is affirmative, the program proceeds to S26 in which the accumulated inflow HC amount hcin.hat and the adsorbed HC amount hcm.hat are determined or estimated.

Figure 38:
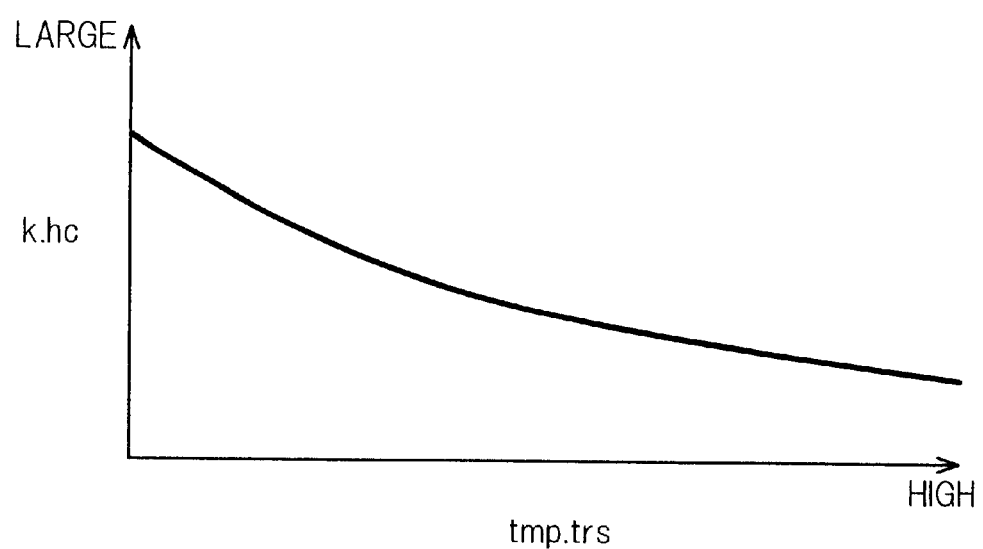
FIG. 38 is a graph showing a characteristic of an HC density correction coefficient referred to in the flow chart of FIG. 35.

The determinations are the same as those in the first embodiment except first that the determination of HC density correction coefficient k.hc (in a step similar to S302 in the flow chart of FIG. 18) is conducted not based on the characteristic shown in FIG. 19, but based on that shown in FIG. 38 in such a manner that the coefficient is retrieved not by the estimated aft-catalyst exhaust gas temperature tmphat.acat, but by the adsorbent temperature tmp.trs, and secondly that the determination of the HC adsorption rate basic value trap.rate (in a step similar to S306 in the flow chart of FIG. 18) is conducted not based on the characteristic shown in FIG. 20, but based on a characteristic similar to that shown in FIG. 30 in such a way that the value is retrieved not by the estimated aft-catalyst exhaust gas temperature tmphat.acta, but by the adsorbent temperature tmp.trs.

The program then proceeds to S28 in which the timer value tm.trs is decremented by the prescribed value X.TM.TRSJUD, to S30 in which it is determined whether the timer value has reached zero. When the result is negative, the program proceeds to S32 in which it is determined whether the adsorbed HC amount has saturated and if it does, proceeds to S34 in which the bit of the flag f.hctrs.on is reset to 0.

In the flow chart of FIG. 35, when the result in S24 is negative, the program proceeds to S36 in which it is determined whether the desorbed HC has been purged in the same manner as the first embodiment except that the HC density correction coefficient (during EGR) k.hc.egr is determined (in a step similar to S422 in the flow chart of FIG. 22), not based on the characteristic shown in FIG. 25, but based on a characteristic similar to that shown in FIG. 32 in the same manner as the second embodiment. In other words, the coefficient k.hc.egr is determined not based on the estimated aft-catalyst exhaust gas temperature tmphat.acat, but based on the adsorbent tmp.trs.

In the flow chart of FIG. 35, when the result in S38 is affirmative, the program proceeds to S40 in which it is discriminated whether the adsorbent 74 has degraded or deteriorated in the same manner as the first embodiment.

Since the degradation discrimination system for an internal combustion engine exhaust gas purification system according to the third embodiment is configured to monitor the behavior of the HC through the HC sensor 104 and to determine the accumulated inflow HC amount hcin.hat in the adsorption mode and the accumulated outflow HC amount hcout.hat in the desorption (and purging) mode such that the ratio agd.pra therebetween should be compared with the threshold value trs.agdlmt to determine whether the adsorbent 74 has degraded or deteriorated, the system can discriminate the occurrence of adsorbent degradation with accuracy.

Further, in addition to the same advantages and effects as the first embodiment, since the system according to the third embodiment is configured to use the value tmp.trs directly indicative of the temperature of the adsorbent 74, the system can have advantages and effects to further improve the calculation accuracy of the HC density correction coefficient (during EGR) k.hc.egr and the other HC density correction coefficient k.hc, thereby enabling to further enhance the calculation accuracy of the threshold value trs.agdlmt and hence, to further enhance the degradation discrimination accuracy of the adsorbent 74.

The first to third embodiments are thus configured to have a system for discriminating degradation of an exhaust purification system of an internal combustion engine (10) having an adsorbent (74) installed at a bypass exhaust gas passage (56) branched from an exhaust pipe (38) of the engine and merged into the exhaust pipe at a location downstream of the adsorbent, the bypass exhaust gas passage being opened by a switch-over valve (60) at starting of the engine to introduce the exhaust gas such that the adsorbent adsorbs unburned HC in exhaust gas generated by the engine and being closed such that the adsorbent desorbs the adsorbed HC and the desorbed HC is thereafter recirculated at a position upstream of a catalyst (40, 42), comprising: engine operating condition detecting means (crank angle sensor 90, a manifold absolute pressure sensor 94, a coolant temperature sensor 96, ECU 114) for detecting operating conditions of the engine; an HC sensor (104) installed at the bypass exhaust gas passage for detecting concentration of the HC (trs.hc) introduced in the bypass exhaust gas passage; inflow HC amount determining means (ECU 114, S26, S300 to S304) for determining an inflow amount of HC (hcin.hat) flowing in the bypass exhaust gas passage and into the adsorbent based at least on an engine speed (NE) and an engine load (PBA) of the detected engine operating conditions and the detected concentration of HC; outflow HC amount determining means (ECU 114, S36, S400 to S426) for determining an outflow amount of HC (hcout.hat) flowing out of the adsorbent and the bypass exhaust gas passage based at least on the engine speed and the engine load of the detected engine operating conditions and the detected concentration of HC; and adsorbent degradation discriminating means (ECU 114, S40, S500 to S510) for discriminating whether the adsorbent has degraded based on the determined inflow HC amount and the outflow HC amount.

In the system, the inflow HC amount determining means includes: exhaust gas volume determining means (ECU 114, S26, S300) for determining a volume of the exhaust gas (trs.sv) flowing in the bypass exhaust gas passage and into the adsorbent based at least on the engine speed and the engine load of the detected engine operating conditions; exhaust gas temperature estimating means (ECU 114, S12, S200 to S204) for estimating a temperature of the exhaust gas (tmphat.acat) flowing in the bypass exhaust gas passage and into the adsorbent based at least on the engine speed and the engine load of the detected engine operating conditions; and correction coefficient determining means (ECU 114, S26, S302) for determining a correction coefficient (k.hc) for correcting the detected concentration of HC; and determining the inflow HC amount based at least on the determined exhaust gas volume, the detected concentration of HC and the determined correction coefficient.

In the system, the desorbed HC is recirculated at a position upstream of the catalyst through an EGR conduit (82), and the outflow HC amount determining means includes: EGR flow rate determining means (ECU 114, S36, S406 to S420) for determining an EGR flow rate (q.egr) recirculated through the EGR conduit based at least on a lift amount of an EGR control valve (lact) provided at the EGR conduit; exhaust gas temperature estimating means (ECU 114, S12, S200 to S204) for estimating a temperature of the exhaust gas (tmphat.acat) flowing in the bypass exhaust gas passage and into the adsorbent based at least on the engine speed and the engine load in the detected engine operating conditions; and correction coefficient determining means (ECU 114, S36, S422) for determining a correction coefficient (k.hc.egr) for correcting the detected concentration of HC; and determines the outflow HC amount based at least on the EGR flow rate, the detected concentration of HC and the determined correction coefficient (ECU 114, S36, S426).

In the system, the adsorbent degradation discriminating means includes: ratio calculating means (ECU 114, S40, S502) for calculating a ratio (agd.pra) between the determined inflow HC amount and the outflow HC amount; adsorbed HC amount estimating means (ECU 114, S36, S424) for estimating an amount of HC (hcm.hat) adsorbed to the adsorbent; threshold value determining means (ECU 114, S20) for determining a threshold value (trs.ag based at least on the estimated adsorbed HC amount; and comparing means (ECU 114, S40, S504) for comparing the calculated with the determined threshold value; and the adsorbent degradation discriminating means discriminates whether the adsorbent has degraded based on a result of comparison, more specifically, the adsorbent degradation discriminating means discriminates that the adsorbent has degraded when the calculated ratio is less than the threshold value (ECU 114, S40, S508).

In the system, the threshold value determining means determines the threshold value based on the estimated adsorbed HC amount (hcm.hat) and a parameter relating to a temperature of the adsorbent.

In the system, the parameter is a temperature of the engine (TW).

The system further includes a temperature sensor (200, 300) installed in the bypass exhaust gas passage; and determines the parameter based on an output of the temperature sensor (tmp.trs).

In the system, the temperature sensor (200) is installed at the adsorbent.

In the system, the temperature sensor (200) is installed at a position downstream of the adsorbent.

In the system, the temperature sensor (300) is installed at a position upstream of the adsorbent.

In the system, the bypass exhaust gas passage is opened for a predetermined period of time (X.TM.TRSLMT) since the starting of the engine and is closed after the predetermined period of time has lapsed.

The system further includes desorption determining means (ECU 114, S32, S32a, S32b) for determining whether the adsorbed HC begins to desorb from the adsorbent; and closes the bypass exhaust gas passage when the adsorbed HC begins to desorb even before the predetermined period time has lapsed (ECU 114, S34).

In the system, the desorption determining means includes; adsorbed HC amount estimating means (ECU 114, S26) for estimating an amount of HC adsorbed to the adsorbent (hcm.hat); threshold value determining means (ECU 114, S18) for determining a threshold value (trs.hcmlmt) based at least on the estimated adsorbed HC amount; and comparing means (ECU 114, S32) for comparing the calculated with the determined threshold value; and determines whether the adsorbed HC begins to desorb based on a result of comparison.

In the system, the desorption determining means includes; a temperature sensor (200) installed in the bypass exhaust gas passage; and determines whether the adsorbed HC begins to desorb based on the detected temperature (ECU 114, S32a, S32b).

In the system, the adsorbent degradation discriminating means (ECU 114, S40, S510) lights a warning lamp (144) when the adsorbent is discriminated to be degraded.

It should be noted in the above that, although the manifold absolute pressure PBA is used as the value indicative of the engine load, it is alternatively possible to use the air flow rate or the throttle opening.

It should also be noted that the switch-over valve may be opened or closed by an electric actuator.

It should further be noted that the adsorbent should not be limited to the type disclosed, any other type may be used if it has an excellent heat-proof property.

While the invention has thus been shown and described with reference to specific embodiments, it should be noted that the invention is in no way limited to the details of the described arrangements, changes and modifications may be made without departing from the scope of the appended claims.

What is claimed is:

1. A system for discriminating degradation of an exhaust purification system of an internal combustion engine having an adsorbent installed at a bypass exhaust gas passage branched from an exhaust pipe of the engine and merged into the exhaust pipe at a location downstream of the adsorbent, the bypass exhaust gas passage being opened by a switch-over valve at starting of the engine to introduce the exhaust gas such that the adsorbent adsorbs unburned HC in exhaust gas generated by the engine and being closed such that the adsorbent desorbs the adsorbed HC and the desorbed HC is thereafter recirculated at a position upstream of a catalyst, comprising:

engine operating condition detecting means for detecting operating conditions of the engine;

an HC sensor installed at the bypass exhaust gas passage for detecting concentration of HC introduced in the bypass exhaust gas passage;

inflow HC amount determining means for determining an inflow amount of HC flowing in the bypass exhaust gas passage and to the adsorbent based at least on an engine speed and an engine load of the detected engine operating conditions and the detected concentration of HC;

outflow HC amount determining means for determining an outflow amount of HC flowing out of the adsorbent and the bypass exhaust gas passage based at least on the engine speed and the engine load of the detected engine operating conditions and the detected concentration of HC; and adsorbent degradation discriminating means for discriminating whether the adsorbent has degraded based on the determined inflow HC amount and the outflow HC amount.

2. A system according to claim 1, wherein the inflow HC amount determining means includes:

exhaust gas volume determining means for determining a volume of the exhaust gas flowing in the bypass exhaust gas passage and into the adsorbent based at least on the engine speed and the engine load of the detected engine operating conditions;

exhaust gas temperature estimating means for estimating a temperature of the exhaust gas flowing in the bypass exhaust gas passage and into the adsorbent based at least on the engine speed and the engine load of the detected engine operating conditions; and correction coefficient determining means for determining a correction coefficient for correcting the detected concentration of HC;

and determines the inflow HC amount based at least on the determined exhaust gas volume, the detected concentration of HC and the determined correction coefficient.

3. A system according to claim 1, wherein the desorbed HC is recirculated at a position upstream of the catalyst through an EGR conduit, and the outflow HC amount determining means includes:

EGR flow rate determining means for determining an EGR flow rate recirculated through the EGR conduit based at least on a lift amount of an EGR control valve provided at the EGR conduit;

exhaust gas temperature estimating means for estimating a temperature of the exhaust gas flowing in the bypass exhaust gas passage and into the adsorbent based at least on the engine speed and the engine load in the detected engine operating conditions; and correction coefficient determining means for determining a correction coefficient for correcting the detected concentration of HC;

and determining the outflow HC amount based at least on the EGR flow rate, the detected concentration of HC and the determined correction coefficient.

4. A system according to claim 2, wherein the desorbed HC is recirculated at a position upstream of the catalyst through an EGR conduit, and the outflow HC amount determining means includes:

EGR flow rate determining means for determining an EGR flow rate recirculated through the EGR conduit based at least on a lift amount of an EGR control valve provided at the EGR conduit; and correction coefficient determining means for determining a correction coefficient for correcting the detected concentration of HC;

and determining the outflow HC amount based at least on the EGR flow rate and the determined correction coefficient.

5. A system according to claim 1, wherein the adsorbent degradation discriminating means includes:
   ratio calculating means for calculating a ratio between the determined inflow HC amount and the outflow HC amount;
   adsorbed HC amount estimating means for estimating an amount of HC adsorbed by the adsorbent;
   threshold value determining means for determining a threshold value based at least on the estimated adsorbed HC amount; and
   comparing means for comparing the calculated with the determined threshold value;
   and the adsorbent degradation discriminating means discriminates whether the adsorbent has degraded based on a result of a comparison.

6. A system according to claim 5, wherein the adsorbent degradation discriminating means discriminates that the adsorbent has degraded when the calculated ratio is less than the threshold value.

7. A system according to claim 5, wherein the threshold value determining means determines the threshold value based on the estimated adsorbed HC amount and a parameter relating to a temperature of the adsorbent.

8. A system according to claim 6, wherein the parameter is a temperature of the engine.

9. A system according to claim 6, further including:
   a temperature sensor installed in the bypass exhaust gas passage;
   and determining the parameter based on an output of the temperature sensor.

10. A system according to claim 8, wherein the temperature sensor is installed at the adsorbent.

11. A system according to claim 8, wherein the temperature sensor is installed at a position downstream of the adsorbent.

12. A system according to claim 8, wherein the temperature sensor is installed at a position upstream of the adsorbent.

13. A system according to claim 1, wherein the bypass exhaust gas passage is opened for a predetermined period of time since the starting of the engine and is closed after the predetermined period of time has lapsed.

14. A system according to claim 13, further including:
   desorption determining means for determining whether the adsorbed HC begins to desorb from the adsorbent;
   and closes the bypass exhaust gas passage when the adsorbed HC begins to desorb even before the predetermined period time has lapsed.

15. A system according to claim 14, the desorption determining means includes;
   adsorbed HC amount estimating means for estimating an amount of HC adsorbed to the adsorbent;
   threshold value determining means for determining a threshold value based at least on the estimated adsorbed HC amount; and
   comparing means for comparing the calculated with the determined threshold value;
   and determining whether the adsorbed HC begins to desorb based on a result of comparison.

16. A system according to claim 14, the desorption determining means includes;
   a temperature sensor installed in the bypass exhaust gas passage;
   and determining whether the adsorbed HC begins to desorb based on the detected temperature.

17. A system according to claim 1, wherein the adsorbent degradation discriminating means lights a warning lamp when the adsorbent is discriminated to be degraded.

18. A method of discriminating degradation of an exhaust purification system of an internal combustion engine having an adsorbent installed at a bypass exhaust gas passage branched from an exhaust pipe of the engine and merged into the exhaust pipe at a location downstream of the adsorbent, the bypass exhaust gas passage being opened by a switch-over valve at starting of the engine to introduce the exhaust gas such that the adsorbent adsorbs unburned HC in exhaust gas generated by the engine and being closed such that the adsorbent desorbs the adsorbed HC and the desorbed HC is thereafter recirculated at a position upstream of a catalyst, comprising the steps of:
   detecting operating conditions of the engine;
   detecting concentration of HC introduced in the bypass exhaust gas passage;
   determining an inflow amount of HC flowing in the bypass exhaust gas passage and into the adsorbent based at least on an engine speed and an engine load of the detected engine operating conditions and the detected concentration of HC;
   determining an outflow amount of HC flowing out of the adsorbent and the bypass exhaust gas passage based at least on the engine speed and the engine load of the detected engine operating conditions and the detected concentration of HC; and
   discriminating whether the adsorbent has degraded based on the determined inflow HC amount and the outflow HC amount.

19. A method according to claim 18, wherein the step of inflow HC amount determining includes the steps of:
   determining a volume of the exhaust gas flowing in the bypass exhaust gas passage and into the adsorbent based at least on the engine speed and the engine load of the detected engine operating conditions;
   estimating a temperature of the exhaust gas flowing in the bypass exhaust gas passage and into the adsorbent based at least on the engine speed and the engine load of the detected engine operating conditions; and
   determining a correction coefficient for correcting the detected concentration of HC;
   and determining the inflow HC amount based at least on the determined exhaust gas volume, the detected concentration of HC and the determined correction coefficient.

20. A method according to claim 18, wherein the desorbed HC is recirculated at a position upstream of the catalyst through an EGR conduit, and the step of outflow HC amount determining includes the steps of:
   determining an EGR flow rate recirculated through the EGR conduit based at least on a lift amount of an EGR control valve provided at the EGR conduit;
   estimating a temperature of the exhaust gas flowing in the bypass exhaust gas passage and into the adsorbent based at least on the engine speed and the engine load in the detected engine operating conditions; and
   determining a correction coefficient for correcting the detected concentration of HC;
   and determining the outflow HC amount based at least on the EGR flow rate, the detected concentration of HC and the determined correction coefficient.

21. A method according to claim 19, wherein the desorbed HC is recirculated at a position upstream of the catalyst through an EGR conduit, and the step of outflow HC amount determining includes the steps of:

determining an EGR flow rate recirculated through the EGR conduit based at least on a lift amount of an EGR control valve provided at the EGR conduit; and determining a correction coefficient for correcting the detected concentration of HC;

and determining the outflow HC amount based at least on the EGR flow rate and the determined correction coefficient.

22. A method according to claim 18, wherein the step of adsorbent degradation discriminating includes the steps of:

calculating a ratio between the determined inflow HC amount and the outflow HC amount;

estimating an amount of HC adsorbed to the adsorbent;

determining a threshold value based at least on the estimated adsorbed HC amount; and comparing the calculated with the determined threshold value;

and discriminating whether the adsorbent has degraded based on a result of comparison.

23. A method according to claim 22, wherein the step of adsorbent degradation discriminating discriminates that the adsorbent has degraded when the calculated ratio is less than the threshold value.

24. A method according to claim 22, wherein the step of threshold value determining determines the threshold value based on the estimated adsorbed HC amount and a parameter relating to a temperature of the adsorbent.

25. A method according to claim 23, wherein the parameter is a temperature of the engine.

26. A method according to claim 23, wherein the parameter is based on an output of a temperature sensor.

27. A method according to claim 26, wherein the temperature sensor is installed at the adsorbent.

28. A method according to claim 26, wherein the temperature sensor is installed at a position downstream of the adsorbent.

29. A method according to claim 26, wherein the temperature sensor is installed at a position upstream of the adsorbent.

30. A method according to claim 18, wherein the bypass exhaust gas passage is opened for a predetermined period of time since the starting of the engine and is closed after the predetermined period of time has lapsed.

31. A method according to claim 30, further including the step of:

determining whether the adsorbed HC begins to desorb from the adsorbent;

and closing the bypass exhaust gas passage when the adsorbed HC begins to desorb even before the predetermined period time has lapsed.

32. A method according to claim 31, the step of desorption determining includes the steps of;

estimating an amount of HC adsorbed to the adsorbent;

determining a threshold value based at least on the estimated adsorbed HC amount; and comparing the calculated with the determined threshold value;

and determining whether the adsorbed HC begins to desorb based on a result of comparison.

33. A method according to claim 31, the step of desorption determining determines whether the adsorbed HC begins to desorb based on a detected temperature.

34. A method according to claim 18, wherein the step of adsorbent degradation discriminating lighting a warning lamp when the adsorbent is discriminated to be degraded.

* * * * *